(12) United States Patent
Kawasaki

(10) Patent No.: US 12,375,834 B2
(45) Date of Patent: Jul. 29, 2025

(54) IMAGING DEVICE

(71) Applicant: SONY SEMICONDUCTOR SOLUTIONS CORPORATION, Kanagawa (JP)

(72) Inventor: Ryohei Kawasaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/497,638

(22) Filed: Oct. 30, 2023

(65) Prior Publication Data

US 2024/0064438 A1    Feb. 22, 2024

Related U.S. Application Data

(63) Continuation of application No. 17/433,428, filed as application No. PCT/JP2020/003507 on Jan. 30, 2020, now Pat. No. 11,843,892.

(51) Int. Cl.
*H04N 25/772* (2023.01)
*H04N 25/78* (2023.01)

(52) U.S. Cl.
CPC ........... *H04N 25/772* (2023.01); *H04N 25/78* (2023.01)

(58) Field of Classification Search
None
See application file for complete search history.

(56) References Cited

U.S. PATENT DOCUMENTS

| 9,774,811 B1* | 9/2017 | Ebihara | H03K 5/249 |
| 11,843,892 B2* | 12/2023 | Kawasaki | H04N 25/78 |
| 2013/0206961 A1* | 8/2013 | Ikeda | H04N 25/75 |
| | | | 250/208.1 |
| 2014/0247381 A1 | 9/2014 | Ohya et al. | |

(Continued)

FOREIGN PATENT DOCUMENTS

| CN | 104023186 A | 9/2014 |
| CN | 104683712 A | 6/2015 |

(Continued)

OTHER PUBLICATIONS

International Search Report and Written Opinion of PCT Application No. PCT/JP2020/003507, issued on Apr. 14, 2020, 07 pages of English Translation and 07 pages of ISRWO.

(Continued)

*Primary Examiner* — Mark T Monk
(74) *Attorney, Agent, or Firm* — CHIP LAW GROUP

(57) ABSTRACT

Each of a plurality of pixels includes a light receiving element that generates an electric charge in response to received light, a pixel circuit that outputs an analog signal in accordance with the electric charge, and a conversion circuit that converts the analog signal into a digital signal based on a reference signal whose voltage changes stepwise. A generation unit that generates, as reference signals, a first reference signal to be supplied to a first pixel of the plurality of pixels and a second reference signal to be supplied to a second pixel of the plurality of pixels different from the first pixel. The first reference signal is supplied to the first pixel of the plurality of pixels via a first wiring, and the second reference signal is supplied to the second pixel of the plurality of pixels different from the first pixel via a second wiring.

10 Claims, 26 Drawing Sheets

(56) References Cited

U.S. PATENT DOCUMENTS

| | | |
|---|---|---|
| 2015/0146063 A1 | 5/2015 | Nishizawa |
| 2016/0344959 A1* | 11/2016 | Mabuchi ............... H04N 25/75 |
| 2017/0272678 A1 | 9/2017 | Sakakibara et al. |
| 2018/0241960 A1 | 8/2018 | Sakakibara |
| 2019/0208151 A1 | 7/2019 | Taura |

FOREIGN PATENT DOCUMENTS

| | | |
|---|---|---|
| CN | 105519096 A | 4/2016 |
| EP | 3079356 A1 | 10/2016 |
| JP | 2011010184 A | 1/2011 |
| JP | 2013-055589 A | 3/2013 |
| JP | 2014-171011 A | 9/2014 |
| JP | 2016-092662 A | 5/2016 |
| JP | 2018-170703 A | 11/2018 |
| JP | 2018-186478 A | 11/2018 |
| WO | WO-2015083674 A1 | 6/2015 |
| WO | 2018/037902 A1 | 3/2018 |

OTHER PUBLICATIONS

Notice of Allowance for U.S. Appl. No. 17/433,428, issued on Jul. 28, 2023, 9 pages.

International Preliminary Report on Patentability of PCT Application No. PCT/JP2020/003507, issued on Sep. 16, 2021, 07 pages of English Translation and 04 pages of IPRP.

\* cited by examiner

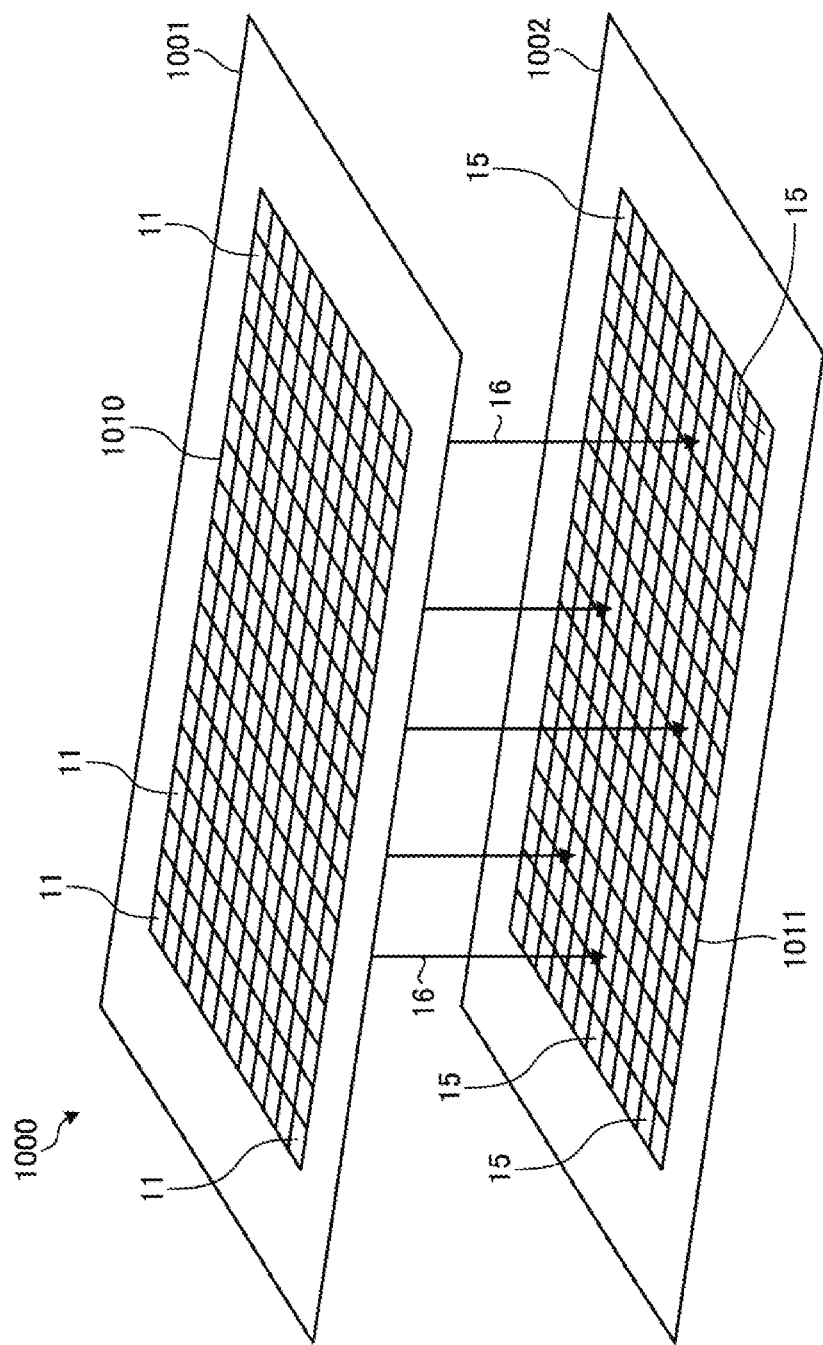

IMAGING DEVICE

CROSS REFERENCE TO RELATED APPLICATIONS

The present application is a continuation application of U.S. patent application Ser. No. 17/433,428, filed Aug. 24, 2021, which is a U.S. National Phase of International Patent Application No. PCT/JP2020/003507 filed on Jan. 30, 2020, which claims priority benefit of Japanese Patent Application No. JP 2019-041793 filed in the Japan Patent Office on Mar. 7, 2019. Each of the above-referenced applications is hereby incorporated herein by reference in its entirety.

TECHNICAL FIELD

The present invention relates to an imaging device.

BACKGROUND ART

A pixel array in which pixels each including a light receiving element that converts received light into an analog signal by photoelectric conversion are disposed in a matrix is known. For this pixel array, a configuration in which an analog to digital (AD) converter that converts a pixel signal based on an analog signal read from each pixel into a pixel signal based on a digital signal is incorporated in each pixel (called an intra-pixel ADC) has been proposed.

For an intra-pixel ADC, a single-slope type ADC using a RAMP signal whose voltage value changes in accordance with gradation over time is generally used. In this single-slope type ADC, a RAMP signal is commonly generated for each pixel of a pixel array, and a counter is operated along with the generation of the RAMP signal. A comparator compares a voltage of the RAMP signal with a voltage of a pixel signal read from a pixel. The comparator inverts an output and stops the counter when a high-low relationship between these voltages is inverted, and outputs time information. This time information is converted into a digital code to obtain a pixel signal converted into a digital signal.

CITATION LIST

Patent Literature

[PTL 1] JP 2013-055589 A
[PTL 2] JP 2018-186478 A

SUMMARY

Technical Problem

In a configuration in which AD conversion with respect to a pixel signal read from each pixel included in a pixel array is performed using a single-slope type intra-pixel ADC, for example, in a case in which an in-plane brightness distribution is flat, simultaneous inversion occurs in outputs of comparators. For that reason, there is a concern of an increase in instantaneous current in the whole pixel array.

An object of the present disclosure is to provide an imaging device in which an instantaneous current in a pixel array can be inhibited.

Solution to Problem

An imaging device according to the present disclosure includes: a plurality of pixels, each of which includes a light receiving element that generates an electric charge by photoelectric conversion in response to received light, a pixel circuit that reads the electric charge from the light receiving element and outputs an analog signal corresponding to the electric charge, and a conversion circuit that converts the analog signal into a digital signal on the basis of comparison results obtained by comparing the analog signal and a reference signal whose voltage changes stepwise at a constant slope over time; a generation unit that generates, as reference signals, a first reference signal to be supplied to a first pixel of the plurality of pixels and a second reference signal to be supplied to a second pixel of the plurality of pixels different from the first pixel; a first wiring that connects the generation unit and the first pixel; and a second wiring that connects the generation unit and the second pixel, wherein the first reference signal is supplied to the first pixel via the first wiring, and the second reference signal is supplied to the second pixel via the second wiring.

BRIEF DESCRIPTION OF DRAWINGS

FIG. 3 is a diagram showing an example of a structure of the imaging device applicable to each embodiment.

DESCRIPTION OF EMBODIMENTS

Figure 1:
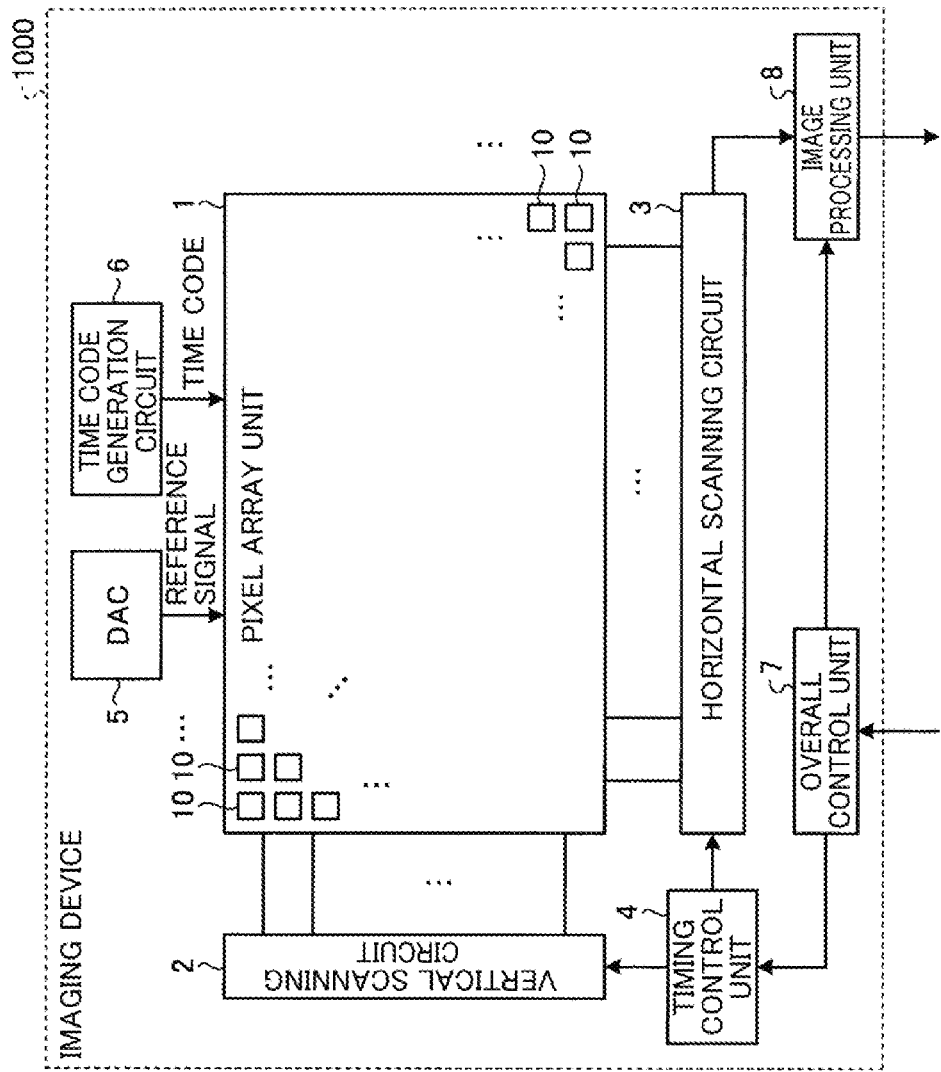
FIG. 1 is a block diagram showing a configuration of an example of an imaging device applicable to each embodiment of the present disclosure.

Hereinafter, each embodiment of the present disclosure will be described in detail with reference to the drawings. Also, in each of the following embodiments, the same parts will be denoted by the same reference numerals and repeated descriptions thereof will be omitted.
(Configuration Common to Each Embodiment)

FIG. 1 is a block diagram showing a configuration of an example of an imaging device applicable to each embodiment of the present disclosure. In FIG. 1, an imaging device 1000 includes a pixel array unit 1, a vertical scanning circuit 2, a horizontal scanning circuit 3, a timing control unit 4, a digital to analog converter (DAC) 5, a time code generation circuit 6, an overall control unit 7, and an image processing unit 8.

The pixel array unit 1 includes a plurality of pixels 10. Further, the pixel 10 includes a light receiving element, a pixel circuit, a conversion circuit, and a storage unit. Although details of each will be described later, the light receiving element generates an electric charge in response to light received by photoelectric conversion. The pixel circuit reads the electric charge generated by the light receiving element and outputs it as an analog signal. The conversion circuit converts the analog signal output from the pixel circuit into a pixel signal, which is a digital signal, on the basis of a reference signal. The storage unit stores the pixel signal converted by the conversion circuit. The pixel 10 may further include a signal processing circuit that performs correlated double sampling (CDS) processing on the pixel signal to reduce noise.

In the pixel array unit 1, the plurality of pixels 10 are disposed in a matrix-like array in a horizontal direction (a row direction) and a vertical direction (a column direction) thereof. In the pixel array unit 1, an arrangement of the pixels 10 in the row direction is called a line. One frame of an image (image data) is formed by pixel signals read from a predetermined number of lines in the pixel array unit 1. For example, in a case in which one frame of an image is formed by 3000 pixels×2000 lines, the pixel array unit 1 includes at least 2000 lines each including at least 3000 pixels 10.

The vertical scanning circuit 2 generates a control signal such as a drive pulse at the time of reading a pixel signal from each pixel 10 in accordance with control of the overall control unit 7, which will be described later, and supplies the control signal to each row of the pixel array unit 1. The horizontal scanning circuit 3 performs a selection operation for selecting each column of the pixel array unit 1 in a predetermined order in accordance with control of the overall control unit 7, thereby sequentially outputting each pixel signal held in the storage unit in each pixel 10. The horizontal scanning circuit 3 is configured by using, for example, a shift register or an address decoder.

The timing control unit 4 generates one or a plurality of types of clock signals for controlling operations of each unit of the imaging device 1000, for example, in accordance with control of the overall control unit 7. The clock signals generated by the timing control unit 4 are supplied to the vertical scanning circuit 2 and the horizontal scanning circuit 3. Further, although not shown, the clock signals generated by the timing control unit 4 are also supplied to the DAC 5 and the time code generation circuit 6.

The DAC 5 generates a reference signal used in the conversion circuit in each pixel 10. For example, the DAC 5 generates a reference signal (a RAMP signal) whose voltage drops (or rises) stepwise at a constant slope on the basis of the clock signal supplied from the timing control unit 4 and a digital value supplied from the overall control unit 7 whose value decreases (or increases) in response to the clock signal. The reference signal generated by the DAC 5 is supplied to the pixel array unit 1 and passed to each pixel 10 included in the pixel array unit 1.

Also, in the following, unless otherwise specified, the fact that sloping of the reference signal (voltage drop or rise) has started is described as 'the reference signal has started'. Similarly, the fact that sloping of the reference signal has ended is described as 'the reference signal has ended'.

The time code generation circuit 6 generates a time code in accordance with a slope of the voltage in the reference signal. For example, in the time code generation circuit 6, a clock signal is supplied from the timing control unit 4, and a signal indicating the start of the reference signal is supplied from the overall control unit 7. When the reference signal has started, the time code generation circuit 6 performs counting on the basis of the clock signal and generates a time code indicating the time for each count time. The time code generated by the time code generation circuit 6 is supplied to the pixel array unit 1 and passed to each pixel 10.

The overall control unit 7 includes, for example, a processor, and controls the overall operation of the imaging device 1000 using a predetermined program. Further, the overall control unit 7 can also control the overall operation of the imaging device 1000 in accordance with control signals input from the outside.

The image processing unit 8 includes, for example, a frame memory, and stores pixel signals for one frame output from the horizontal scanning circuit 3. The image processing unit 8 performs predetermined image processing on the stored pixel signals for one frame. As the image processing here, processing such as gain adjustment and white balance adjustment are conceivable. Not limited thereto, the image processing unit 8 can also execute processing such as edge extraction and face determination.

Figure 2:
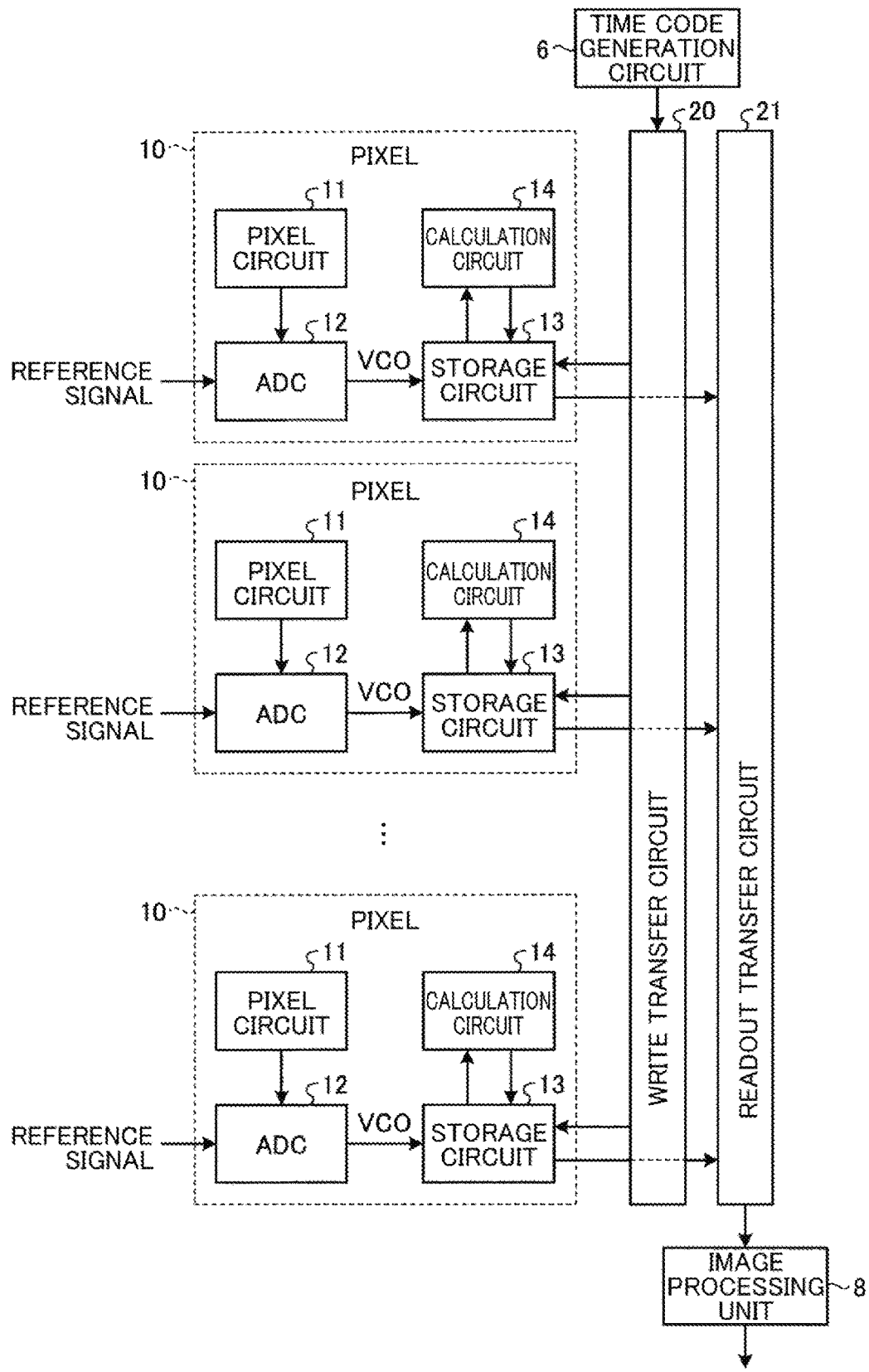
FIG. 2 is a block diagram showing an example of a configuration of a pixel applicable to each embodiment.

FIG. 2 is a block diagram showing an example of a pixel configuration applicable to each embodiment. In FIG. 2, the pixel 10 includes a pixel circuit 11, an analog to digital converter (ADC) 12, a storage circuit 13, and a calculation circuit 14.

The pixel circuit 11 includes a light receiving element and a readout circuit. The readout circuit reads out the electric charge generated in response to the light received by the light receiving element from the light receiving element. The readout circuit outputs an analog signal having a voltage corresponding to the read electric charge. The analog signal output from the readout circuit is supplied to the ADC 12. Further, the reference signal is supplied from the DAC 5 to the ADC 12.

Although the details will be described later, the DAC 5 generates the reference signal for detecting a reset level of the readout circuit in one reading process from the readout circuit, and then generates the reference signal for detecting a level of the analog signal read from the readout circuit.

The ADC 12 includes a comparison circuit. The comparison circuit compares the analog signal supplied from the pixel circuit 11 with the reference signal supplied from the DAC 5 and inverts an output signal VCO in a case in which a high-low relationship of a voltage between the analog signal and the reference signal is inverted. The output signal VCO of the ADC 12 is supplied to the storage circuit 13.

On the other hand, the time code generation circuit 6 generates a time code that is updated at clock time intervals in accordance with, for example, a clock signal. The time code generated by the time code generation circuit 6 is supplied to a write transfer circuit 20. For example, the write transfer circuit 20 is provided for each column in the pixel array unit 1, and a plurality of pixels 10 aligned in the corresponding row are connected thereto. The write transfer circuit 20 supplies the time code supplied from the time code generation circuit 6 to each connected pixel 10.

The storage circuit 13 is, for example, a latch circuit and holds the time code supplied from the write transfer circuit 20. For example, the storage circuit 13 updates the time code supplied and held immediately before with the time code supplied from the write transfer circuit 20. The storage circuit 13 stops updating the time code at the timing when the output signal VCO supplied from the ADC 12 is inverted.

Further, the calculation circuit 14 performs noise removal processing on the analog signal read from the readout circuit on the basis of the time code held in the storage circuit 13. For example, the calculation circuit 14 performs an operation to obtain a difference between a time code held on the basis of the reference signal for detecting the reset level of the readout circuit and a time code held on the basis of the reference signal for detecting the level of the analog signal read from the readout circuit. Pixel data can be obtained on the basis of this difference. This pixel data is pixel data from which offset noise has been removed and is returned to the storage circuit 13. The storage circuit 13 holds the pixel data returned from the calculation circuit 14.

At the end timing of the reference signal, for example, for each row, the pixel data from which the noise has been removed is read from the storage circuit 13 of each pixel 10 aligned in a row, and the read pixel data is output via a readout transfer circuit 21.

For example, the readout transfer circuit 21 reads time codes from the pixels 10 designated by each of the vertical scanning circuit 2 and the horizontal scanning circuit 3 and outputs the time codes as the pixel data. The pixel data output from the readout transfer circuit 21 is supplied to the image processing unit 8 and stored in the frame memory. For example, when one frame of the pixel data is stored in the frame memory, the image processing unit 8 performs predetermined image processing on the pixel data stored in the frame memory and outputs the pixel data to the outside of the imaging device 1000, for example.

FIG. 3 is a diagram showing an example of a structure of the imaging device 1000 applicable to each embodiment. In FIG. 3, the imaging device 1000 is formed as one imaging device 1000 by bringing a first semiconductor chip 1001 and a second semiconductor chip 1002 into electrical contact with each other, for example, via a conductive path 16 and bonding them.

A pixel region 1010 is disposed on the first semiconductor chip 1001. In the pixel region 1010, light receiving elements are disposed in a matrix. In the example of FIG. 3, pixel circuits 11 are disposed in a matrix with respect to the pixel region 1010. A pixel logic region 1011 is disposed on the second semiconductor chip 1002. In the pixel logic region 1011, for example, processing circuits 15 corresponding to the pixel circuits 11 are disposed in a matrix to correspond to the arrangement of the pixel circuits 11 in the first semiconductor chip 1001. The processing circuit 15 includes, for example, the ADC 12, the storage circuit 13, and the calculation circuit 14 shown in FIG. 3. That is, the pixel 10 includes the pixel circuit 11 disposed on the first semiconductor chip 1001 and the processing circuit 15 disposed on the second semiconductor chip 1002 on a one-to-one basis with respect to the pixel circuit 11.

In the above description, among the elements included in the pixel 10, the pixel circuit 11 is disposed on the first semiconductor chip 1001, and the processing circuit 15 is disposed on the second semiconductor chip 1002, but the arrangement is not limited to this example. For example, the pixel circuit 11 and a part of the processing circuit 15 corresponding to the pixel circuit 11 can be disposed on the first semiconductor chip 1001, and other parts of the processing circuit 15 corresponding to the pixel circuit 11 can be disposed on the second semiconductor chip 1002. As an example, among the elements included in the processing circuit 15, a part of the ADC 12 is disposed on the first semiconductor chip 1001 together with the corresponding pixel circuit 11, and other parts of the ADC 12 are disposed on the second semiconductor chip 1002 together with the storage circuit 13 and the calculation circuit 14 included in the corresponding processing circuit 15.

Figure 4A:
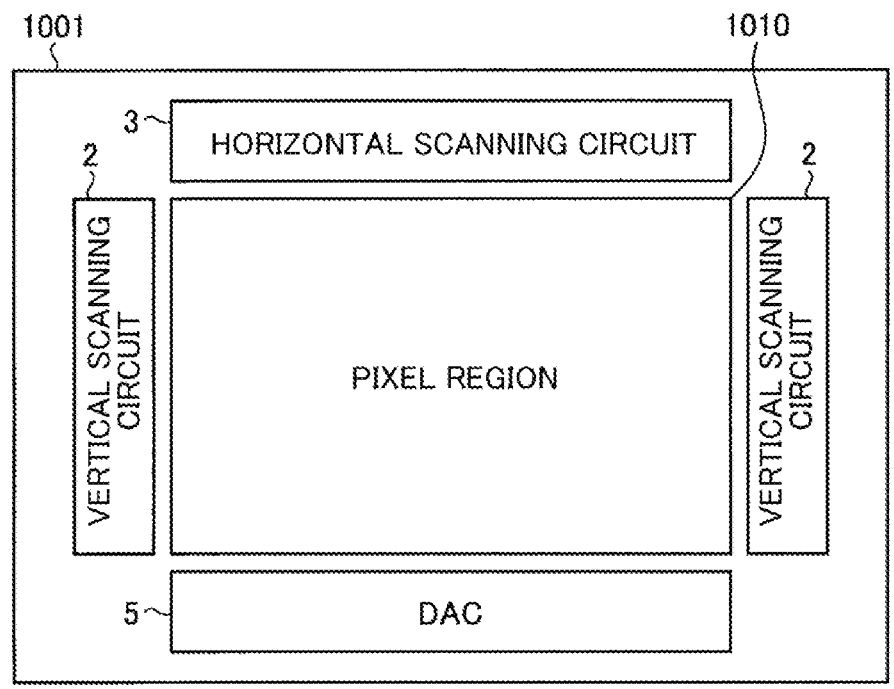
FIG. 4A is a diagram showing an arrangement example of each unit in a first semiconductor chip.

Next, the arrangement of each part in the first semiconductor chip 1001 and the second semiconductor chip 1002 will be schematically described. FIG. 4A is a diagram showing an arrangement example of each part in the first semiconductor chip 1001. In FIG. 4A, the pixel region 1010 is disposed on the first semiconductor chip 1001, and a part of the vertical scanning circuit 2, a part of the horizontal scanning circuit 3, and the DAC 5 are also disposed. In the example of FIG. 4A, vertical scanning circuits 2 are disposed on both sides of the pixel region 1010 in the row direction (left and right sides in FIG. 4A). Further, in the example of FIG. 4A, a part of the horizontal scanning circuit 3 is disposed on one side of the pixel region 1010 in the column direction (for example, an upper side in FIG. 4A), and the DAC 5 is disposed on the other side in the column direction.

Figure 4B:
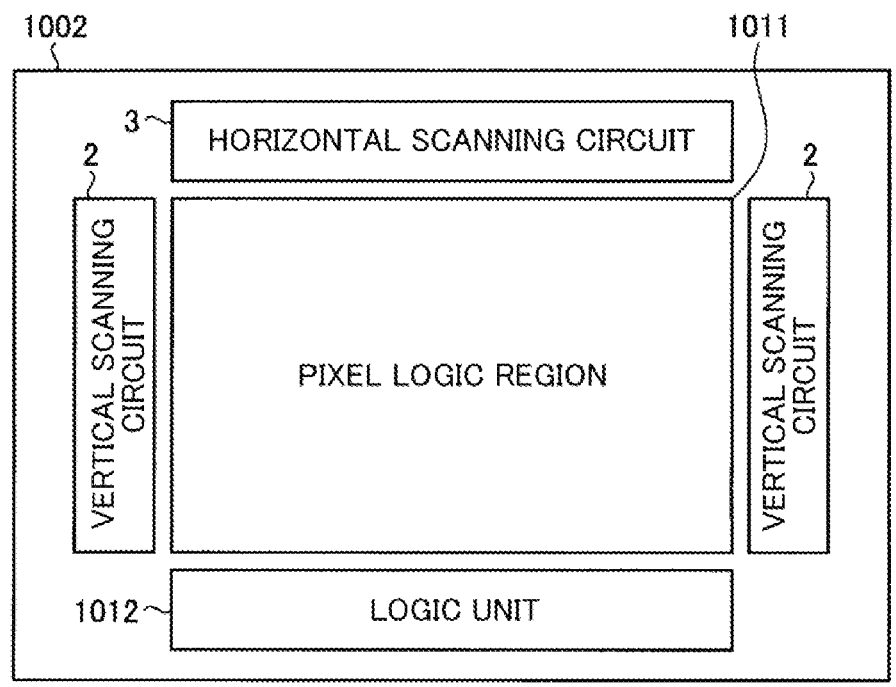
FIG. 4B is a diagram showing an arrangement example of each unit in a second semiconductor chip.

FIG. 4B is a diagram showing an arrangement example of each part in the second semiconductor chip 1002. In FIG. 4B, the pixel logic region 1011 is disposed on the second semiconductor chip 1002, and a part of the vertical scanning circuit 2, a part of the horizontal scanning circuit 3, and a logic unit 1012 are also disposed thereon. The logic unit 1012 includes, for example, the timing control unit 4, the time code generation circuit 6, the overall control unit 7, and the image processing unit 8 shown in FIG. 1.

Further, in the examples of FIGS. 4A and 4B, the vertical scanning circuit 2 and the horizontal scanning circuit 3 are separate and disposed on the first semiconductor chip 1001 and the second semiconductor chip 1002.

Figure 5A:
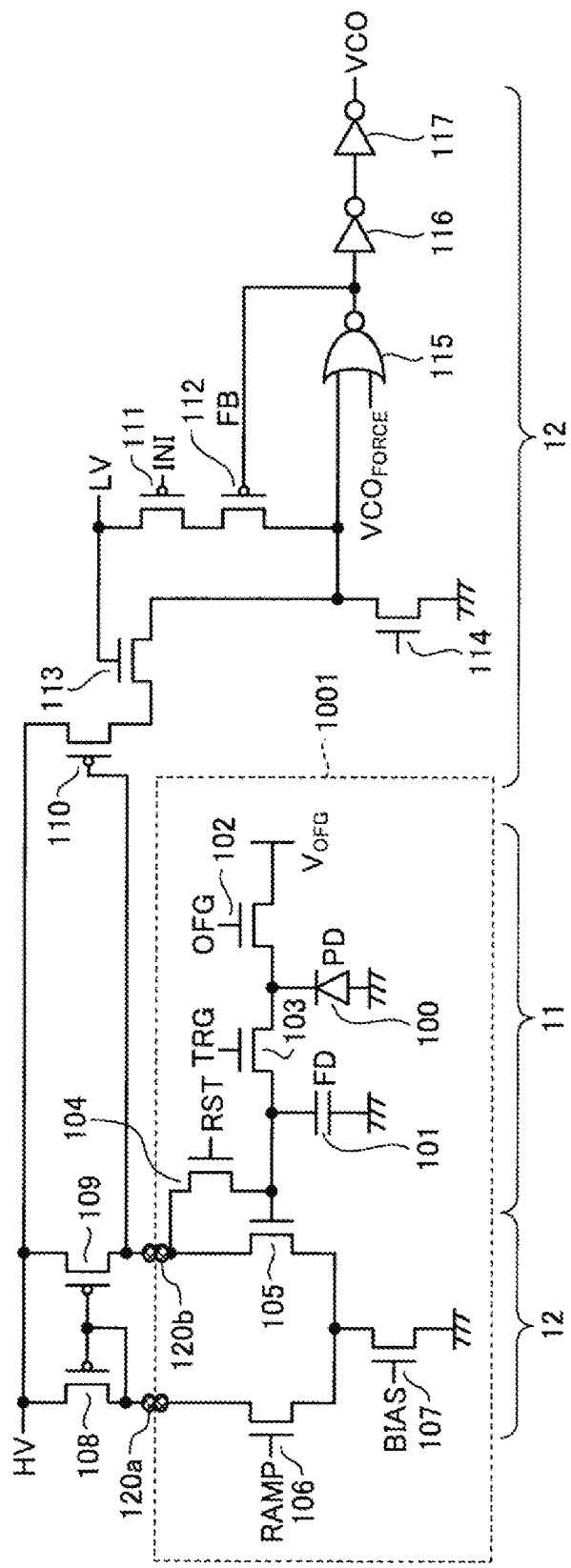
FIG. 5A is a circuit diagram showing a configuration example of a pixel circuit and an ADC applicable to each embodiment.
Figure 5B:
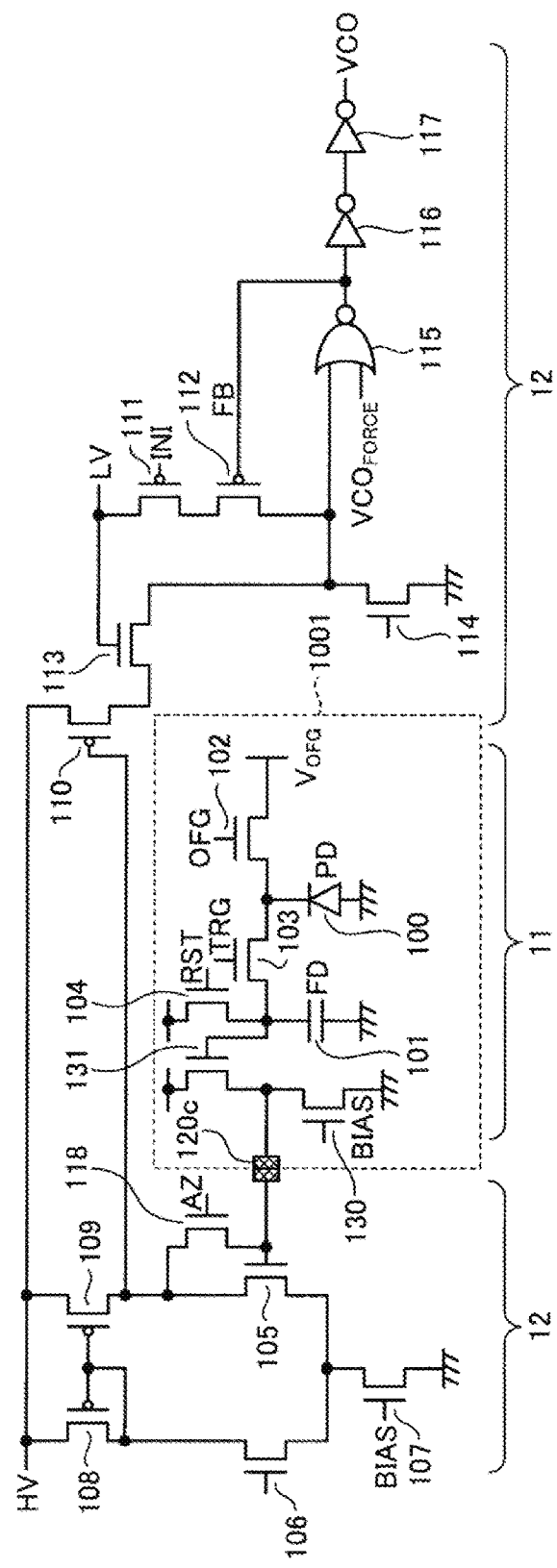
FIG. 5B is a circuit diagram showing a configuration example of a pixel circuit and an ADC applicable to each embodiment.

Next, configurations of the pixel circuit 11 and the ADC 12 applicable to each embodiment will be described with reference to FIGS. 5A and 5B. FIGS. 5A and 5B are circuit diagrams showing a configuration example of the pixel circuit 11 and the ADC 12 applicable to each embodiment. FIG. 5A shows an example of a circuit of the pixel circuit 11 and the ADC 12 in a case in which the pixel circuit 11 and a part of the ADC 12 are disposed on the first semiconductor chip 1001, which is applicable to each embodiment. Other parts of the ADC 12 are disposed on the second semiconductor chip 1002.

In FIG. 5A, the pixel circuit 11 includes a reset transistor 104, a floating diffusion (FD) 101, a transfer transistor 103, a photodiode (PD) 100, and a discharge transistor 102. For the reset transistor 104, the transfer transistor 103, and the discharge transistor 102, for example, N-channel metal-oxide-semiconductor (MOS) transistors are used.

The photodiode 100 generates an electric charge by photoelectric conversion. The discharge transistor 102 discharges the electric charge accumulated in the photodiode 100 at the start of exposure in accordance with a drive signal OFG supplied from the vertical scanning circuit 2. The transfer transistor 103 transfers the electric charge from the photodiode 100 to the FD 101 at the end of exposure in accordance with a transfer signal TRG from the vertical scanning circuit 2. The FD 101 accumulates the transferred electric charge and generates a voltage corresponding to the amount of the accumulated electric charge. The reset transistor 104 initializes the FD 101 in accordance with a reset signal RST supplied from the vertical scanning circuit 2.

The ADC 12 includes a comparator including transistors 108, 109, and 110, which are P-channel MOS transistors, and transistors 106, 107, and 105, which are N-channel MOS transistors.

The transistors 106 and 105 form a differential pair, and the sources of these transistors are commonly connected to the drain of the transistor 107. Also, the drain of the transistor 106 is connected to the drain of the transistor 108 and the gates of the transistors 108 and 109. The drain of the transistor 105 is connected to the drain of the transistor 109, the gate of the transistor 110, and the drain of the reset transistor 104. Further, a RAMP signal is input to the gate of the transistor 106 as a reference signal.

A predetermined bias voltage BIAS is applied to the gate of the transistor 107, and a predetermined ground voltage is applied to the source of the transistor 107. The gate of the transistor 105 is connected to the reset transistor 104, the FD 101, and the transfer transistor 103.

The transistors 108 and 109 form a current mirror circuit. A power supply voltage HV is applied to the sources of the transistors 108, 109, and 110. This power supply voltage HV is set to be higher than a power supply voltage LV. Further, the drain of the transistor 110 is connected to the transistor 113 constituting a voltage conversion circuit.

Further, the pixel circuit 11 and the transistors 106, 107, and 105 are formed in the first semiconductor chip 1001. The transistors 105 and 106 are connected to the transistors 108 and 109, which form the current mirror circuit, formed on the second semiconductor chip 1002 via connection portions 120a and 120b by, for example, copper-copper connection (CCC) or the like.

The power supply voltage LV is applied to the gate of the transistor 113 that constitutes the voltage conversion circuit, which is a part of the ADC 12. The voltage conversion circuit can convert the power supply voltage HV to the lower power supply voltage LV, and a circuit that operates at a low voltage can be disposed at a stage subsequent thereto. The drain of the transistor 113 is connected to the drain of the transistor 110 and the source thereof is connected to a positive feedback circuit that is part of the ADC 12.

In the example of FIG. 5A, the positive feedback circuit is configured to include transistors 111 and 112, which are P-channel MOS transistors, a transistor 114, which is an N-channel MOS transistor, and a NOR circuit 115.

In the positive feedback circuit, the transistors 111 and 112 are connected in series with the power supply voltage LV. Further, a drive signal INI supplied from the vertical scanning circuit 2 is input to the gate of the transistor 111. The drain of the transistor 112 is connected to the source of the transistor 113, the drain of the transistor 114, and one input end of the NOR circuit 115. A control signal VCO-FORCE supplied from the vertical scanning circuit 2 is input to the other input end of the NOR circuit 115. The output of the NOR circuit 115 is input to the gate of the transistor 112 as a positive feedback signal FB.

A ground voltage is applied to the source of the transistor 114, and a drive signal supplied from the vertical scanning circuit 2 is input to the gate.

The output of the NOR circuit 115 is further output as an output signal VCO via buffer circuits 116 and 117.

In the above configuration, in a case in which a high-low relationship between a voltage generated by the FD 101 input to the gate of the transistor 105 and a voltage of the reference signal input to the gate of the transistor 106 is inverted, the comparator inverts a signal output from the drain of transistor 109 from a high level to a low level. This signal is further inverted by the transistor 110 and input to the voltage conversion circuit (transistor 113). At this time, since the signal input to the voltage conversion circuit is dull, a voltage of the high level is an intermediate voltage. Thus, the positive feedback circuit provided at a stage subsequent to the voltage conversion circuit raises the voltage of the high level and shapes the signal. This shaped signal is output as the output signal VCO of the ADC 12.

FIG. 5B shows a circuit example of a case in which the pixel circuit 11 is disposed on the first semiconductor chip 1001 and the whole ADC 12 is disposed on the second semiconductor chip 1002, which is applicable to each embodiment. In the example of FIG. 5B, the output of the pixel circuit 11 and the gate of the transistor 105 constituting the comparator in the ADC 12 are connected via a connection portion 120c by CCC or the like. Here, unlike the usual CCC, the connection portion 120c uses a configuration in which parallel flat plates are formed and capacitively coupled.

At this time, when viewed from a comparator side, in order to prevent the capacity of the connection portion 120c from appearing to be the capacity of the FD 101, a buffer formed by transistors 130 and 131, which are N-channel MOS transistors, is provided between the connection portion 120c and the FD 101.

Further, in the configuration of FIG. 5B, the drain of the transistor 118, which is an N-channel MOS transistor, is connected to the drain of the transistor 105, and the source thereof is connected to the gate of the transistor 105. An auto-zero signal AZ is supplied to the gate of the transistor 118, for example, from the vertical scanning circuit 2. The transistor 118 is controlled such that it is turned on/off in accordance with the auto-zero signal AZ, is connected between the drain and the gate of the transistor 105 in an on state thereof, and initializes the capacity of the connection portion 120c when seen from the transistor 105, for example. Also, the auto-zero signal AZ does not need to be synchronized with the reset signal RST.

Also, in a case in which the configuration shown in FIG. 5A is applied to the example in which the DAC 5 is disposed on the first semiconductor chip 1001 shown in FIGS. 4A and 4B described above, a signal line (RAMP line) and a driver for supplying the reference signal (RAMP signal) output from the DAC 5 to the transistor 106 are disposed on the first semiconductor chip 1001. On the other hand, in a case in which the configuration shown in FIG. 5B is applied to the arrangement example shown in FIGS. 4A and 4B, the RAMP line and the driver are disposed on the second semiconductor chip 1002. In a case in which the DAC 5 includes this driver, the DAC 5 will be divided and disposed onto the first semiconductor chip 1001 and the second semiconductor chip 1002.

Further, the arrangement shown in FIGS. 4A and 4B described above is not limited to this example. For example, the DAC 5 can also be disposed on the second semiconductor chip 1002. In the case of applying the configuration shown in FIG. 5A to this arrangement, the RAMP line and the driver are disposed on the first semiconductor chip 1001. In a case in which the DAC 5 includes this driver, the DAC 5 will be divided and disposed onto the first semiconductor chip 1001 and the second semiconductor chip 1002. On the other hand, in a case in which the configuration shown in FIG. 5B is applied to the example in which the DAC 5 is disposed on the second semiconductor chip 1002, the RAMP line and the driver are disposed on the second semiconductor chip 1002.

Figure 6:
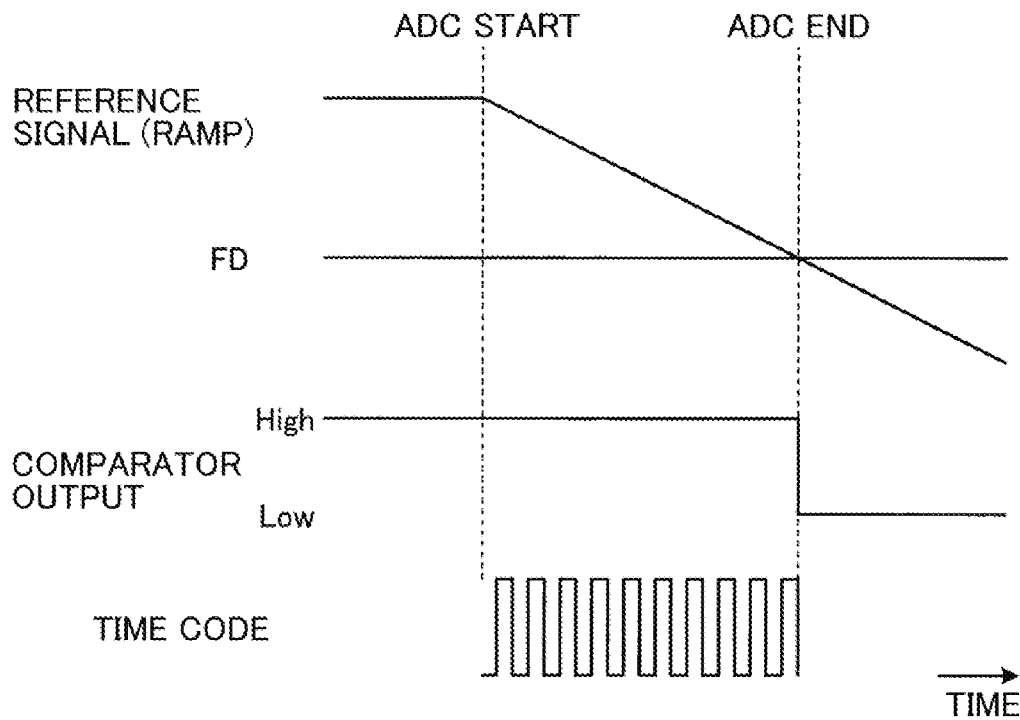
FIG. 6 is a diagram for explaining an operation of an ADC and a storage circuit applicable to each embodiment.

Operations of the pixel circuit 11, the ADC 12, and the storage circuit 13 applicable to each embodiment will be described with reference to FIGS. 6 and 7. FIG. 6 is a diagram for explaining operations of the ADC 12 and the storage circuit 13 applicable to each embodiment. In FIG. 6, the reference signal (RAMP signal) is shown as a signal whose voltage drops at a predetermined slope with the elapse of time. Also, in FIG. 6, for the sake of explanation, the reference signal is shown as a slope-shaped signal in which the voltage drops linearly with respect to time, but in reality, the DAC 5 produces a signal in which the voltage drops stepwise in response to, for example, a gradation value.

The time when the voltage drop in the reference signal starts is set as the time when the ADC operation starts, and the time code generation circuit 6 generates the time code in accordance with a predetermined clock. In the example of FIG. 6, the time code is updated in the high state of the signal shown as the time code. The storage circuit 13 holds the time code generated by the time code generation circuit 6. When the supplied time code is updated, the storage circuit 13 updates the held time code with the updated time code.

When the ADC operation is started, the voltage of the reference signal and the voltage of the FD 101 are compared in the comparator of the ADC 12. When the high-low relationship of these voltages is inverted, the comparator inverts the output signal in the high state to put it in the low state and ends the ADC operation. The storage circuit 13 stops updating the held time code in response to the inversion of the output of the comparator. As a result, the time code at the time when the ADC operation is completed is held in the storage circuit 13.

Figure 7:
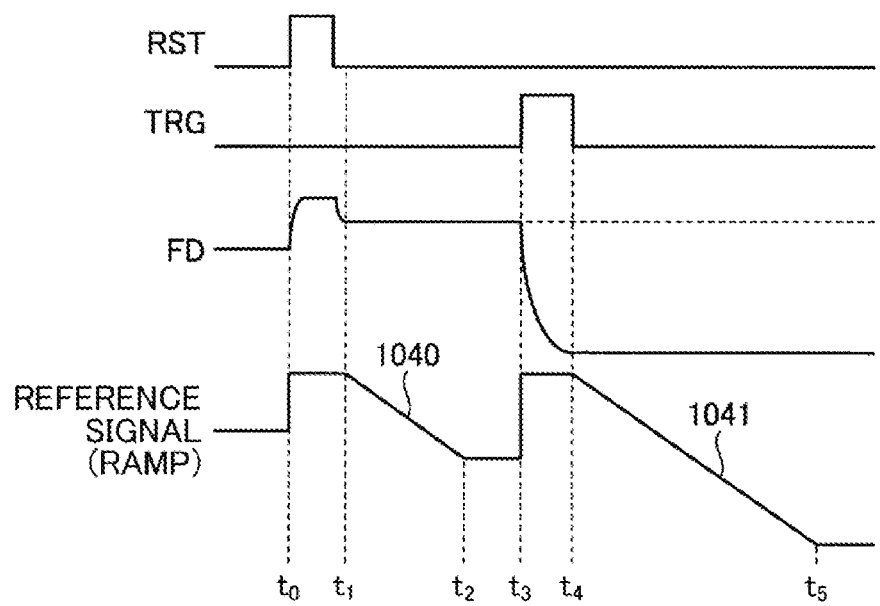
FIG. 7 is a diagram showing an example of a relationship between an operation of a pixel circuit and a reference signal applicable to each embodiment.

FIG. 7 is a diagram showing an example of the relationship between the operation of the pixel circuit 11 and the reference signal, which can be applied to each embodiment. The reference signal is initially, for example, the voltage of the reset level of the FD 101 detected last time. The reset signal RST is set to the high state at times $t_0$ to $t_1$, and the FD 101 is initialized. After initialization of the FD 101, the DAC 5 drops the voltage of the reference signal from a predetermined voltage. As a result, a first slope 1040 of the reference signal is formed. In response to this first slope 1040, a first ADC operation is performed in the ADC 12. Due to this first ADC operation, the voltage of the reset level of the FD 101 is detected on the basis of the first slope 1040 of the reference signal. The DAC 5 stops the decrease of the reference signal at a predetermined timing (time $t_2$), and sets the voltage of the reference signal to the predetermined voltage at the start of the voltage drop.

Next, the transfer signal TRG is set to the high state at time $t_3$ to $t_4$, the electric charge is transferred from the photodiode 100 to the FD 101, and the FD 101 generates a voltage corresponding to an amount of the transferred electric charge. The DAC 5 causes the transfer signal TRG to drop the voltage of the reference signal from the predetermined voltage at time $t_4$. As a result, a second slope 1041 of the reference signal is formed. In response to this second slope 1041, a second ADC operation is started in the ADC 12. Due to this second ADC operation, a voltage corresponding to the amount of electric charge in the FD 101 is detected on the basis of the second slope 1041 of the reference signal. The DAC 5 stops the decrease of the reference signal when the reference signal reaches a lower limit (time $t_5$).

By obtaining the difference between the voltage detected by the first ADC operation and the voltage detected by the second ADC operation, a pixel signal from which offset noise has been removed can be obtained. In this way, the ADC 12 performs the ADC operation twice in reading the pixel signal once in the pixel circuit 11.

(Example of Configuration Using Existing Technique)

Figure 8:
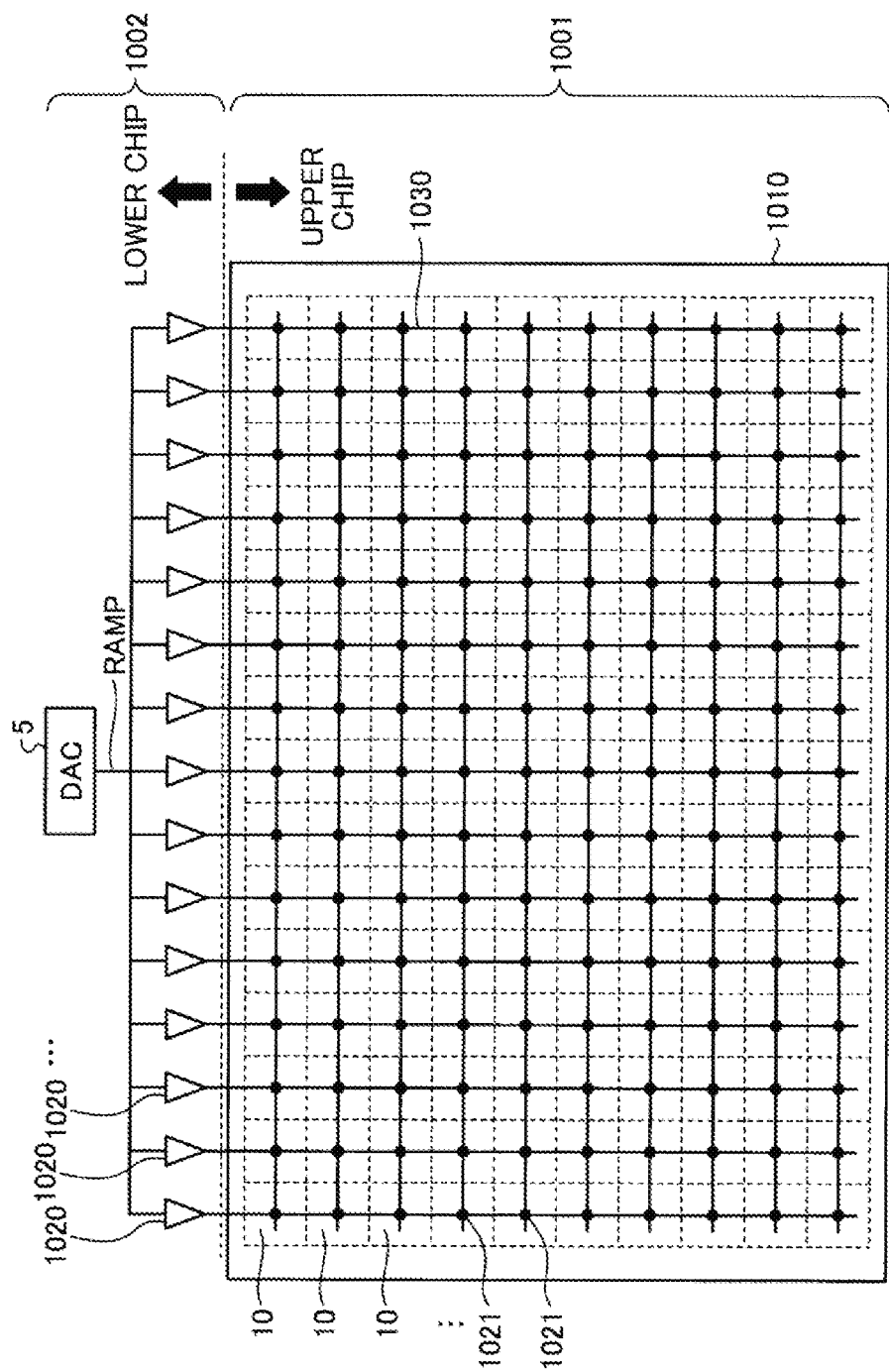
FIG. 8 is a diagram showing a configuration of an example of an imaging device according to an existing technique.

Next, prior to the description of the present disclosure, the supply of the reference signal to the pixel array unit by the intra-pixel ADC according to the existing technique will be described with reference to FIGS. 8 and 9. FIG. 8 is a diagram showing a configuration of an example of an imaging device according to the existing technique. Also, in FIG. 8, for example, in the configuration of the imaging device 1000 shown in FIG. 1, the pixel array unit 1 and the DAC 5 are extracted and shown. A method of supplying the reference signal to the pixel array unit in which each pixel has an intra-pixel ADC configuration will be described with reference to FIG. 8. Further, in FIG. 8 and similar figures thereafter, the first semiconductor chip 1001 is shown as an "upper chip", and the second semiconductor chip 1002 is shown as a "lower chip".

In the upper chip, pixels 10 having an intra-pixel ADC configuration are disposed in a matrix in the pixel region 1010. Further, the DAC 5 for generating and supplying a reference signal is provided on the lower chip. The reference signal output from the DAC 5 is supplied to each column in the pixel array unit 1 via each driver 1020 provided in each column. The reference signal is supplied to each pixel 10 in the pixel array unit 1 via a grid-like wiring 1030 corresponding to the arrangement of the pixels 10.

For example, in the pixel array unit 1, a transparent insulating film is formed on each pixel 10. The wiring 1030 is formed on the transparent insulating film and is connected to the circuit in each pixel 10 via a via hole 1021 provided in the transparent insulating film.

Figure 9:
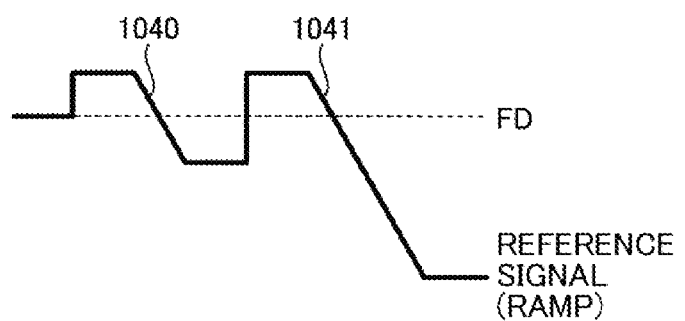
FIG. 9 is a diagram showing an example of a reference signal output by a DAC in an existing technique.

FIG. 9 is a diagram showing an example of a reference signal output by the DAC 5 in the existing technique. As described with reference to FIG. 7, the reference signal includes the first slope 1040 for detecting the voltage at the reset level of the FD 101 and the second slope 1041 for detecting the voltage corresponding to the amount of electric charge accumulated in the FD 101.

According to the existing technique, for example, in a case in which a brightness distribution of light received by the pixel array unit 1 in a plane of the pixel region 1010 is flat, the output of the comparator will be inverted all at once in the ADC 12. For this reason, there is a concern of an increase in instantaneous current in the whole pixel array unit 1.

First Embodiment

Next, a first embodiment will be described. In the first embodiment, a plurality of DACs for generating and supplying reference signals are provided, and for example, each of the plurality of DACs generates and outputs each reference signal offset in a voltage direction or a time direction. Each reference signal is supplied to different pixels 10 via different wirings. With such a configuration, for example, in a case in which the brightness distribution of the light received by the pixel array unit 1 in the plane of the pixel region 1010 is flat, it is possible to avoid simultaneous inversion of the comparator in each intra-pixel ADC.

Figure 10:
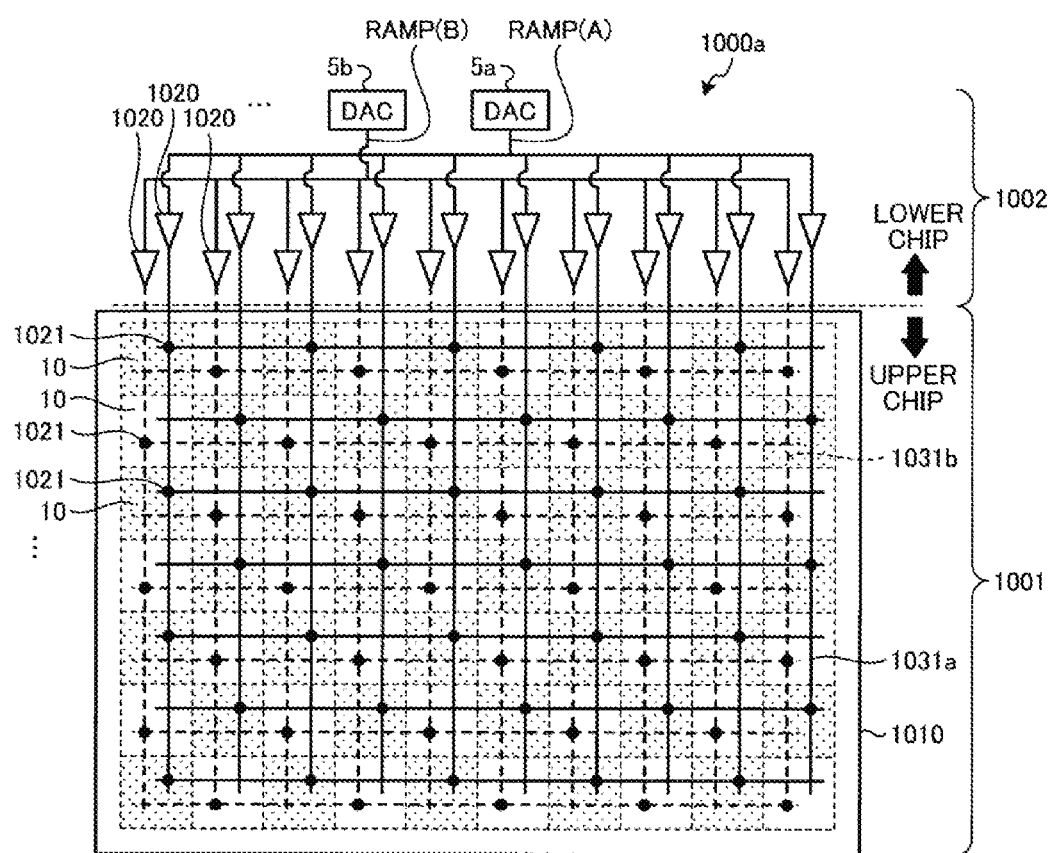
FIG. 10 is a diagram showing a configuration of an example of an imaging device according to a first embodiment.

FIG. 10 is a diagram showing a configuration of an example of an imaging device according to the first embodiment. Further, in FIG. 10, in the configuration of the imaging device 1000 shown in FIG. 1, the pixel array unit 1 and the DAC 5 (DACs 5a and 5b in the example of FIG. 10), which are closely related to the first embodiment, are extracted and shown, and other parts are omitted.

In FIG. 10, an imaging device 1000a includes two DACs 5a and 5b that generate and output reference signals, respectively. In the example of FIG. 10, the DACs 5a and 5b are collectively provided on one side of the pixel region 1010. The output from the DAC 5a is connected to wiring 1031a provided on the pixel region 1010 via the driver 1020. On the other hand, the output of the DAC 5b is connected to wiring 1031b provided on the pixel region 1010 via the driver 1020.

THE wirings 1031a and 1031b are formed in two layers, for example, via a transparent insulating film. The wirings 1031a and 1031b are connected to different pixels 10 via the via holes 1021, respectively. More specifically, in the example of FIG. 10, the wirings 1031a and 1031b are connected to pixels 10 that are not adjacent to each other.

FURTHER, in the first embodiment, the wirings 1031a and 1031b are provided in a grid pattern to correspond to the positions of the pixels 10 disposed in a matrix arrangement, respectively. In the example of FIG. 10, each wiring 1031a and 1031b is configured as a grid of every other column and every other row, respectively. Each wiring 1031a and 1031b is provided with the via hole 1021 at each grid point and is connected to the pixel 10 via the via hole 1021.

THE DAC 5a generates a first reference signal (referred to as RAMP (A)) and supplies it to the wiring 1031a via each driver 1020. The first reference signal is supplied to each pixel 10 connected to the wiring 1031a via the wiring 1031a. Similarly, the DAC 5b generates a second reference signal (referred to as RAMP (B)) and supplies it to the wiring 1031b via each driver 1020. The second reference signal is supplied to each pixel 10 connected to the wiring 1031b via the wiring 1031b.

FURTHER, in a case in which the pixel circuit 11 and a part of the ADC 12 are disposed on the first semiconductor chip 1001 and other parts are disposed on the second semiconductor chip 1002 in the pixel 10 described with reference to FIG. 5A, the wirings 1031a and 1031b are preferably provided on the first semiconductor chip 1001. On the other hand, in a case in which the pixel circuit 11 is disposed on the first semiconductor chip 1001 and other parts are disposed on the second semiconductor chip 1002 in the pixel 10 described with reference to FIG. 5B, the wirings 1031a and 1031b are preferably provided on the second semiconductor chip 1002.

(About Reference Signal According to First Embodiment)

AS described above, in the first embodiment, a plurality of reference signals are distributed and supplied to each pixel 10 included in the pixel region 1010. As a result, in a case in which each pixel 10 included in the pixel region 1010 has the intra-pixel ADC configuration, it is possible to avoid simultaneous inversion of the output of the comparator in each pixel 10 included in the pixel region 1010.

Next, the reference signal according to the first embodiment will be described. In the first embodiment, a signal obtained by applying an offset to the first reference signal generated by the DAC 5a is generated as the second reference signal by the DAC 5b. The offset applied to the reference signal will be described with reference to FIGS. 11 and 12.

Figure 11:
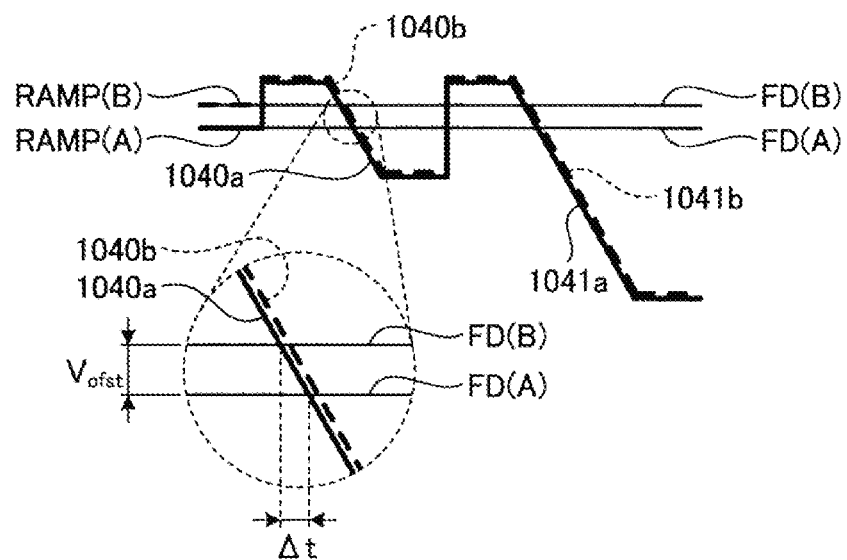
FIG. 11 is a diagram for explaining a first offset according to the first embodiment.

FIG. 11 is a diagram for explaining a first offset according to the first embodiment. The first offset provides an offset voltage $V_{ofst}$ to the reset levels of the first reference signal (RAMP (A)) and the second reference signal (RAMP (B)) generated by the DACs 5a and 5b. Due to this offset voltage $V_{ofst}$, for the same FD voltage, a FD voltage FD_A seen from the first reference signal and a FD voltage FD_B seen from the second reference signal can be made relatively different from each other by an amount corresponding to the offset voltage $V_{ofst}$.

In the example of FIG. 11, before detecting the reset level of the FD voltage, the reset level of the second reference signal is set to a voltage obtained by adding the offset voltage $V_{ofst}$ to the reset level of the first reference signal.

In the example of FIG. 11, a first slope 1040a and a second slope 1041a of the first reference signal and a first slope 1040b and a second slope 1041b of the second reference signal are the same. On the other hand, as described above, the FD voltage FD_A seen from the first reference signal and the FD voltage FD_B seen from the second reference signal are different from each other by the offset voltage $V_{ofst}$. For that reason, as enlarged and shown in the lower left of FIG. 11, a time difference Δt corresponding to the offset voltage $V_{ofst}$ occurs between an inversion timing of the comparator with respect to the FD voltage FD_A in the first reference signal and an inversion timing of the comparator with respect to the FD voltage FD_B in the second reference signal. Thus, it is possible to avoid simultaneous inversion of the outputs of the comparators in the pixel array unit 1.

Also, in this case, the first reference signal generated by the DAC 5a can be considered to be a signal in which the offset voltage $V_{ofst}=0$ is applied to the first reference signal.

Figure 12:
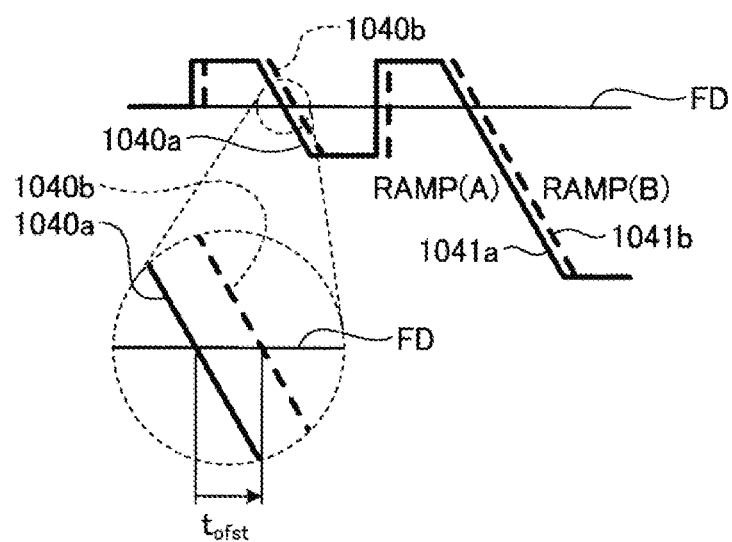
FIG. 12 is a diagram for explaining a second offset according to the first embodiment.

FIG. 12 is a diagram for explaining a second offset according to the first embodiment. The second offset is an offset in the time direction with respect to the first reference signal (RAMP (A)) generated by the DAC 5a. As shown in FIG. 12, the DAC 5a generates the first reference signal (RAMP (A)) including the first slope 1040a and the second slope 1041a. On the other hand, the DAC 5b generates a signal obtained by applying an offset time $t_{ofst}$ to the first reference signal as the second reference signal (RAMP (B)).

In the example of FIG. 12, timings of the first slope 1040b and the second slope 1041b of the second reference signal are shifted by the offset time $t_{ofst}$ with respect to the first slope 1040a and the second slope 1041a of the first reference signal, respectively. For that reason, as enlarged and shown in the lower left of FIG. 12, the first slope 1040b of the second reference signal is shifted in the time direction with respect to the first slope 1040a of the first reference signal, and thus a difference in the offset time $t_{ofst}$ occurs at the timing at which the first slopes 1040a and 1040b intersect with respect to the same voltage FD. Thus, even in a case in which the voltage FD of the FD 101 supplied from the pixel circuit 11 to the ADC 12 is equal in each pixel 10, the difference in the offset time $t_{ofst}$ occurs in the inversion timing of the comparator between each pixel 10 to which the first reference signal is supplied and each pixel 10 to which the second reference signal is supplied. Therefore, it is possible to avoid simultaneous inversion of the outputs of the comparators in the pixel array unit 1.

In this case, the first reference signal generated by the DAC 5a can be considered to be a signal in which the offset time $t_{ofst}$ of zero time is applied to the first reference signal.

First Modified Example of First Embodiment

Next, a first modified example of the first embodiment will be described. In the first embodiment described above, as shown in FIG. 10, DACs 5a and 5b are collectively provided on one side of the pixel region 1010, but the arrangement is not limited to this example. In the first modified example of the first embodiment, the DAC 5a is provided on one side of opposite sides of the pixel region 1010, and the DAC 5b is provided on the other side.

Figure 13:
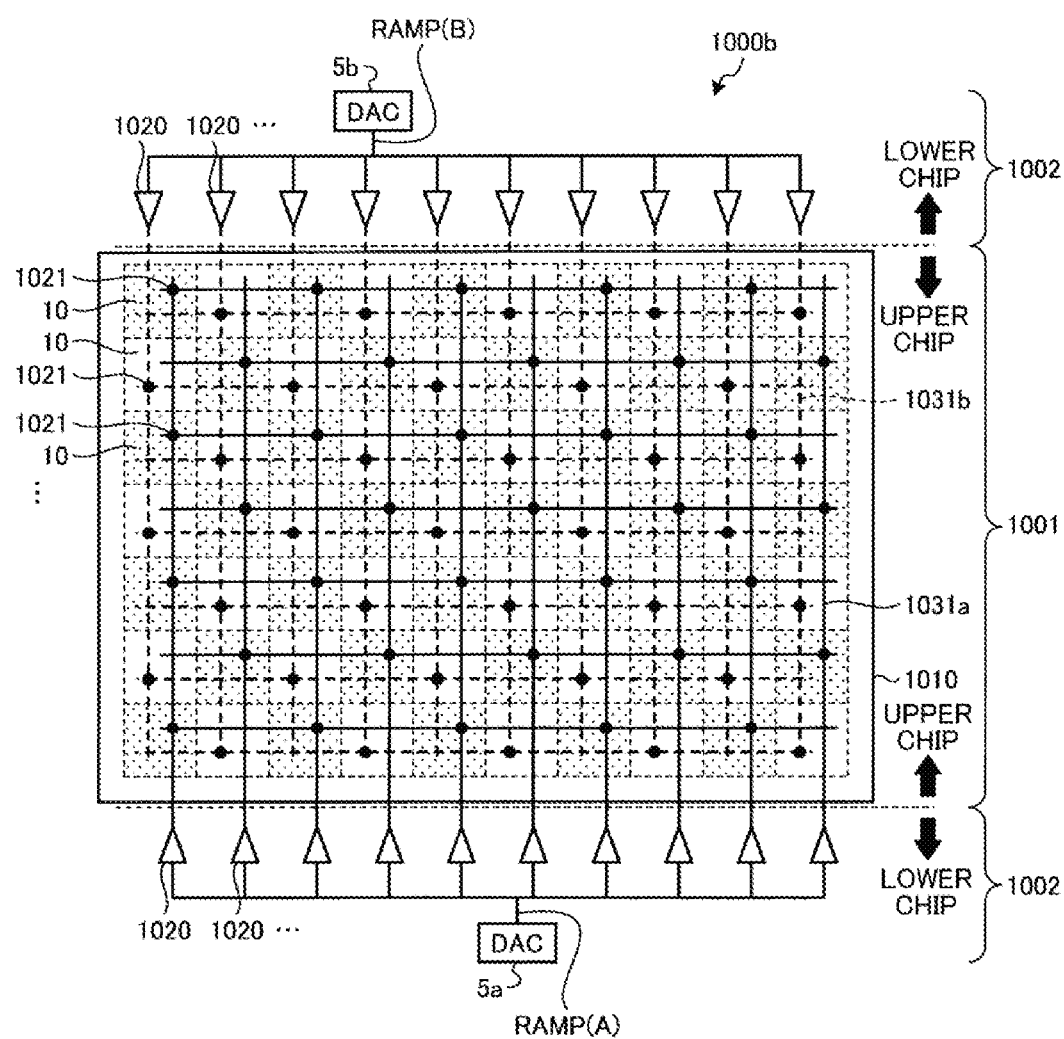
FIG. 13 is a diagram showing a configuration of an example of an imaging device according to a first modified example of the first embodiment.

FIG. 13 is a diagram showing a configuration of an example of an imaging device according to the first modified example of the first embodiment. Also, in FIG. 13, similarly to FIG. 10 described above, in the configuration of the imaging device 1000 shown in FIG. 1, the pixel array unit 1 and the DAC 5 (DACs 5a and 5b in the example of FIG. 10), which are closely related to the first modified example of the first embodiment, are extracted and shown, and other parts are omitted.

In FIG. 13, an imaging device 1000b includes two DACs 5a and 5b that generate and output reference signals, respectively. In the example of FIG. 13, the DAC 5a is provided on one side of the pixel region 1010. On the other hand, the DAC 5b is provided on a side opposite to the DAC 5a with the pixel region 1010 sandwiched therebetween. The output of the DAC 5a is connected to the wiring 1031a provided on the pixel region 1010 from one side of the pixel region 1010 via the driver 1020. Further, the output of the DAC 5b is connected to the wiring 1031b provided on the pixel region 1010 from the side of the pixel region 1010 opposite to the side on which the above-mentioned DAC 5a is provided with the pixel region 1010 sandwiched therebetween via the driver 1020.

The first reference signal (RAMP (A)) generated by DAC 5a and the second reference signal (RAMP (B)) generated by DAC 5b can be applied with either the first offset (offset voltage $V_{ofst}$) and the second offset (offset time $t_{ofst}$) described in the first embodiment.

In this first modified example of the first embodiment, similarly to the above-mentioned first embodiment, even in the case in which the voltage of the FD 101 supplied from the corresponding pixel circuit 11 to the ADC 12 is also equal between the pixel 10 to which the first reference signal is supplied and the pixel 10 to which the second reference signal is supplied, the inversion timing of the comparator in each pixel 10 can be made different.

Further, even in a case in which either the arrangement of DACs 5a and 5b according to FIG. 10 or the arrangement of DACs 5a and 5b according to FIG. 13 is selected due to a limitation of a layout on a semiconductor chip, the same effect can be obtained.

Second Modified Example of First Embodiment

Next, a second modified example of the first embodiment will be described. The second modified example of the first embodiment is an example in a case in which a color filter is provided for each pixel 10 included in the pixel array unit 1.

In the second modified example of the first embodiment, in this case, one wiring of a plurality of wirings that supply different reference signals is commonly connected to each pixel 10 of the plurality of pixels 10, which is provided with the color filter that passes the same wavelength component therethrough. In this way, the reference signal is supplied to each pixel 10 provided with the color filter that passes the same wavelength component therethrough via the common wiring, and thus it is possible to avoid the influence of the offset in the reference signal on the pixel signals having the same wavelength component. Also, in the following, unless otherwise specified, the "same wavelength component" is described as a "same color".

Figure 14:
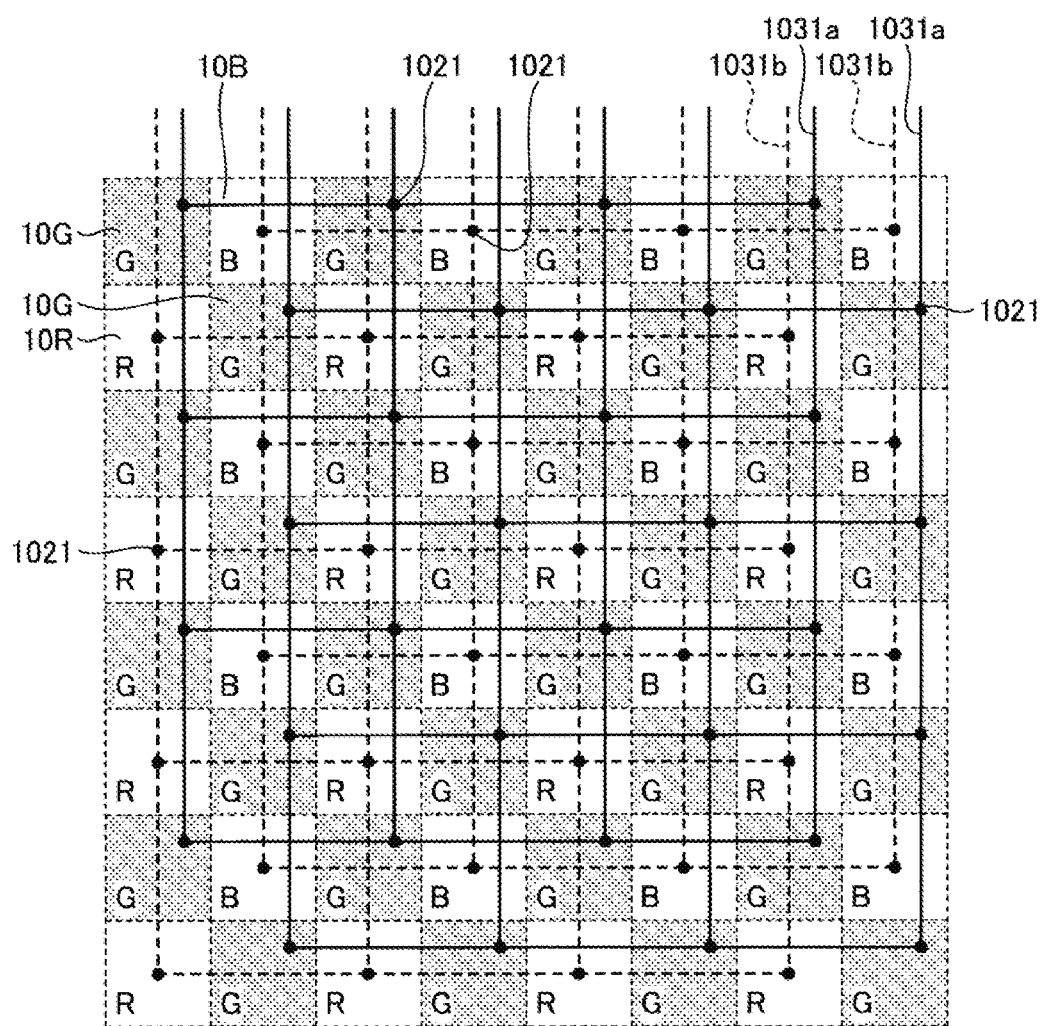
FIG. 14 is a diagram showing a first example of wiring according to a second modified example of the first embodiment.

FIG. 14 is a diagram showing a first example of the wiring according to the second modified example of the first embodiment. In the example of FIG. 14, for each pixel 10, color filters of red (R) color, green (G) color, and blue (B) color are provided in units of 2 pixels×2 pixels in accordance with the Bayer arrangement. In the example of FIG. 14, one color filter of R color, one color filter of B color, and two color filters of G color are provided for four pixels 10 of 2 pixels×2 pixels such that the color filters of the same color are not adjacent to each other. In FIG. 14, the pixels 10 provided with the color filters of R color, G color, and B color are shown as a pixel 10R, a pixel 10G, and a pixel 10B, respectively.

In the example of FIG. 14, for example, the wiring 1031a to which the first reference signal (RAMP (A)) is supplied is connected to each pixel 10G. On the other hand, the wirings 1031b to which the second reference signal (RAMP (B)) is supplied are connected to the pixels 10R and 10B, respectively. In this case, two types of reference signals are applied for the three color filters of R color, G color, and B color. For that reason, the first reference signal is supplied to the pixel 10G provided with the color filter of G color, which is perceptually more sensitive. Further, the second reference signal is commonly supplied to the pixels 10R and 10B provided with the color filters of R color and B color, which are less sensitive than G color.

Figure 15:
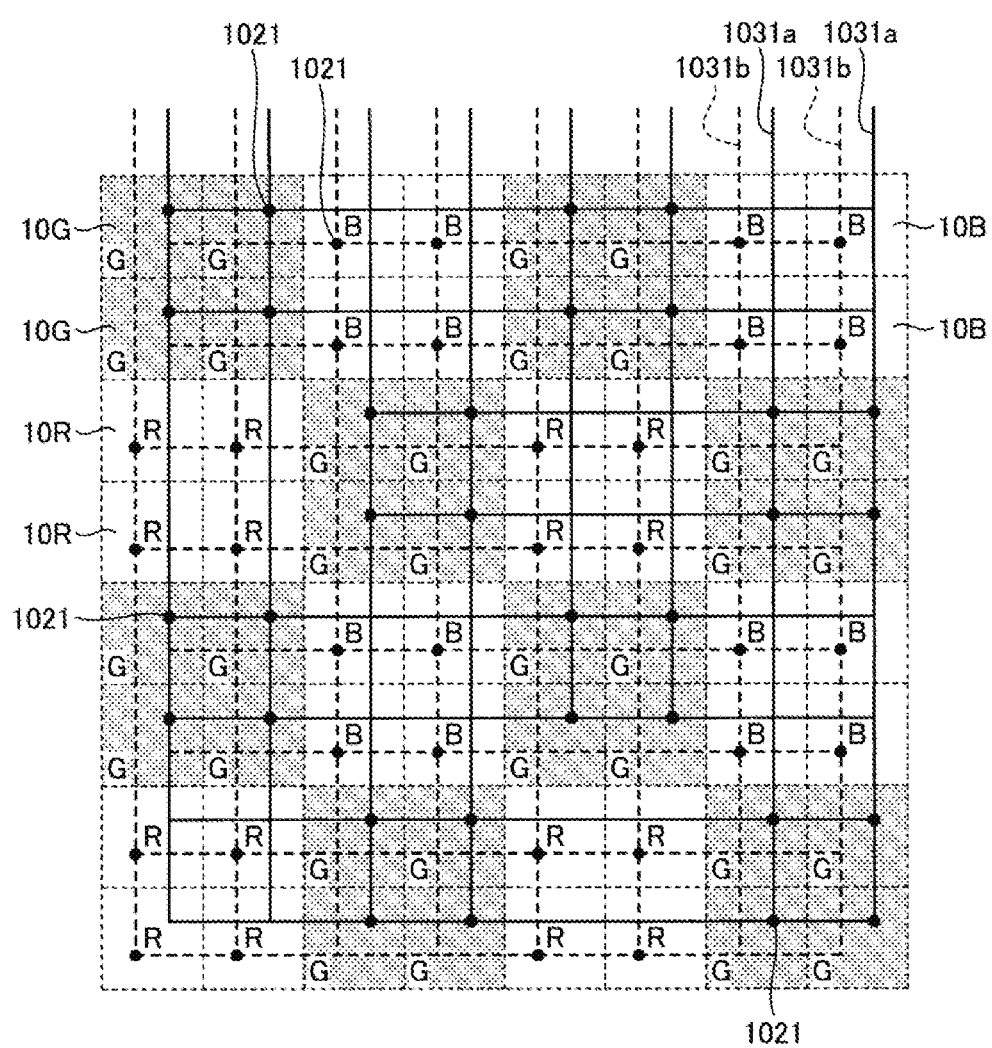
FIG. 15 is a diagram showing a second example of wiring according to the second modified example of the first embodiment.

FIG. 15 is a diagram showing a second example of the wiring according to the second modified example of the first embodiment. The second example is a wiring example of a case in which the color filters of R color, G color, and B color are provided for each pixel 10 in a different arrangement from the Bayer arrangement. In the example of FIG. 15, each color filter of R color, G color, and B color is provided in each pixel 10 in an arrangement in which each pixel of the Bayer arrangement is divided into 4 pixels consisting of 2 pixels×2 pixels. This color filter arrangement is called a 4-divided Bayer type RGB arrangement.

In this 4-divided Bayer type RGB arrangement, as in the case of the Bayer type arrangement described with reference to FIG. 14, for example, the wiring 1031a to which the first reference signal (RAMP (A)) is supplied is also connected to each pixel 10G. On the other hand, the wirings 1031b to which the second reference signal (RAMP (B)) is supplied are connected to the pixels 10R and 10B, respectively. In the 4-divided Bayer type RGB arrangement, the color filters of the same color are provided for four adjacent pixels 10 in an arrangement of 2 pixels×2 pixels. For that reason, the wirings 1031a and 1031b are connected in the arrangement of 2 pixels×2 pixels in units of four adjacent pixels 10.

Figure 16:
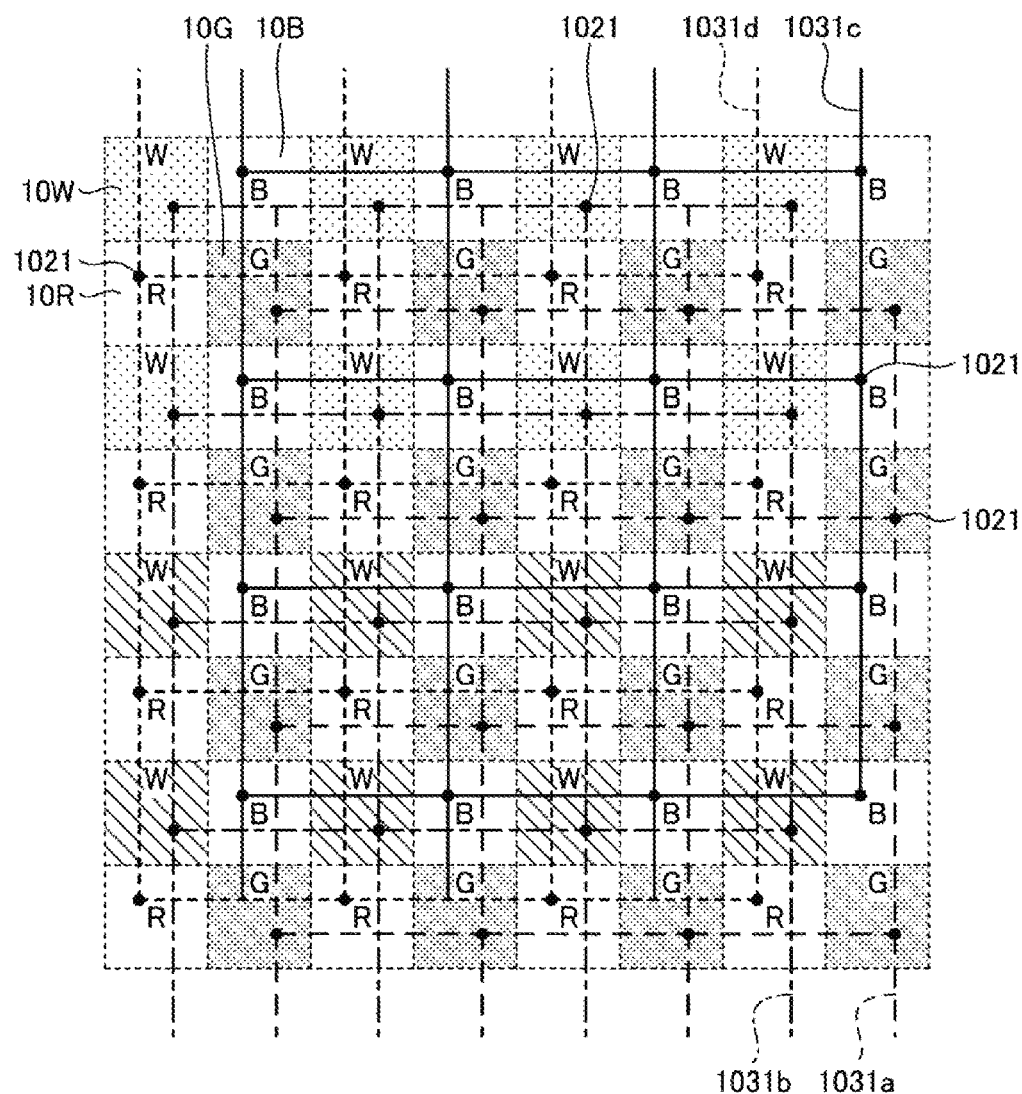
FIG. 16 is a diagram showing a third example of wiring according to the second modified example of the first embodiment.

FIG. 16 is a diagram showing a third example of the wiring according to the second modified example of the first embodiment. The third example is an example in which three or more reference signals are supplied via different wirings. The example of FIG. 16 is an example in which a color filter of white (W) color is provided in addition to the color filters of R color, G color, and B color as the color filters provided for each pixel 10. In FIG. 16, the pixel 10 provided with the color filter of W color is shown as a pixel 10W. The color filter of white (W) color is, for example, a color filter that transmits all wavelengths in a visible light region with a transmittance of a predetermined value or higher. As the W color filter, a filter that transmits wavelengths outside the visible light region such as a near infrared region with a transmittance of a predetermined value or higher in addition to all wavelengths in the visible light region can also be used. Not limited to this, the pixel 10W of W color may be configured without a color filter. Each of these color filters of R color, G color, B color, and W color is provided on a one-to-one basis for each of the four pixels 10 of 2 pixels×2 pixels.

In the example of FIG. 16, four types of reference signals are supplied to correspond to, for example, four color filters of R color, G color, B color, and W color. For example, in addition to the DACs 5a and 5b that generate the first and second reference signals, respectively, two DACs 5 are provided, for example, to generate a third reference signal and a fourth reference signal offset from the first reference signal. The second, third, and fourth reference signals are, for example, signals in which different offsets are applied to the first reference signal.

In FIG. 16, the wiring 1031a is connected to each pixel 10G. The wiring 1031b is connected to each pixel 10W, and the wiring 1031c is connected to each pixel 10B. Similarly, the wiring 1031d is connected to each pixel 10R. Here, the wirings 1031a and 1031b are connected to the outputs of the DACs 5a and 5b (not shown) provided on one side of the pixel region 1010 (a lower side of the pixel region 1010 in the example of FIG. 16). Further, the outputs of the two DACs 5 that generate the third reference signal and the fourth reference signal are connected to the wirings 1031c and 1031d, respectively.

Second Embodiment

Figure 17:
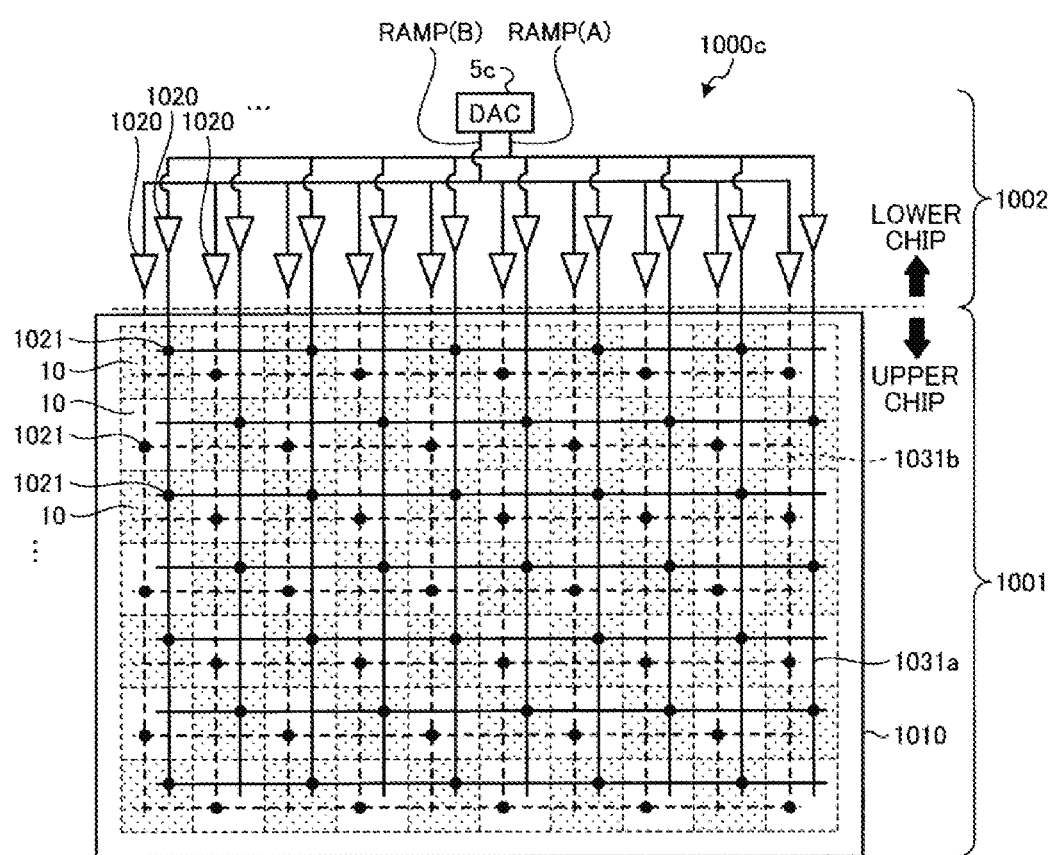
FIG. 17 is a diagram showing a configuration of an example of an imaging device according to a second embodiment.

Next, a second embodiment will be described. The second embodiment is an example in which a plurality of reference signals to which different offsets are applied are generated and output by one DAC 5. FIG. 17 is a diagram showing a configuration of an example of an imaging device according to the second embodiment. Also, in FIG. 17, the pixel array unit 1 and the DAC 5 (DAC 5c in the example of FIG. 17) in the configuration of the imaging device 1000 shown in FIG. 1, which are closely related to the first embodiment, are extracted and shown, and other parts are omitted.

In FIG. 17, an imaging device 1000c according to the second embodiment includes a DAC 5c that can generate the first reference signal (RAMP (A)) and the second reference signal (RAMP (B)) to which different offsets are applied and output them at the same time. The output of the first reference signal of the DAC 5c is connected to the wiring 1031a via each driver 1020. Further, the output of the second reference signal of the DAC 5c is connected to the wiring 1031b via each driver 1020 different from that of the first reference signal.

Also, in FIG. 17, since the connections of the wirings 1031a and 1031b to each pixel 10 are the same as, for example, those in FIG. 10 described above, the description thereof will be omitted here.

(Example of Circuit that can Generate and Output First and Second Reference Signals)

Figure 18:
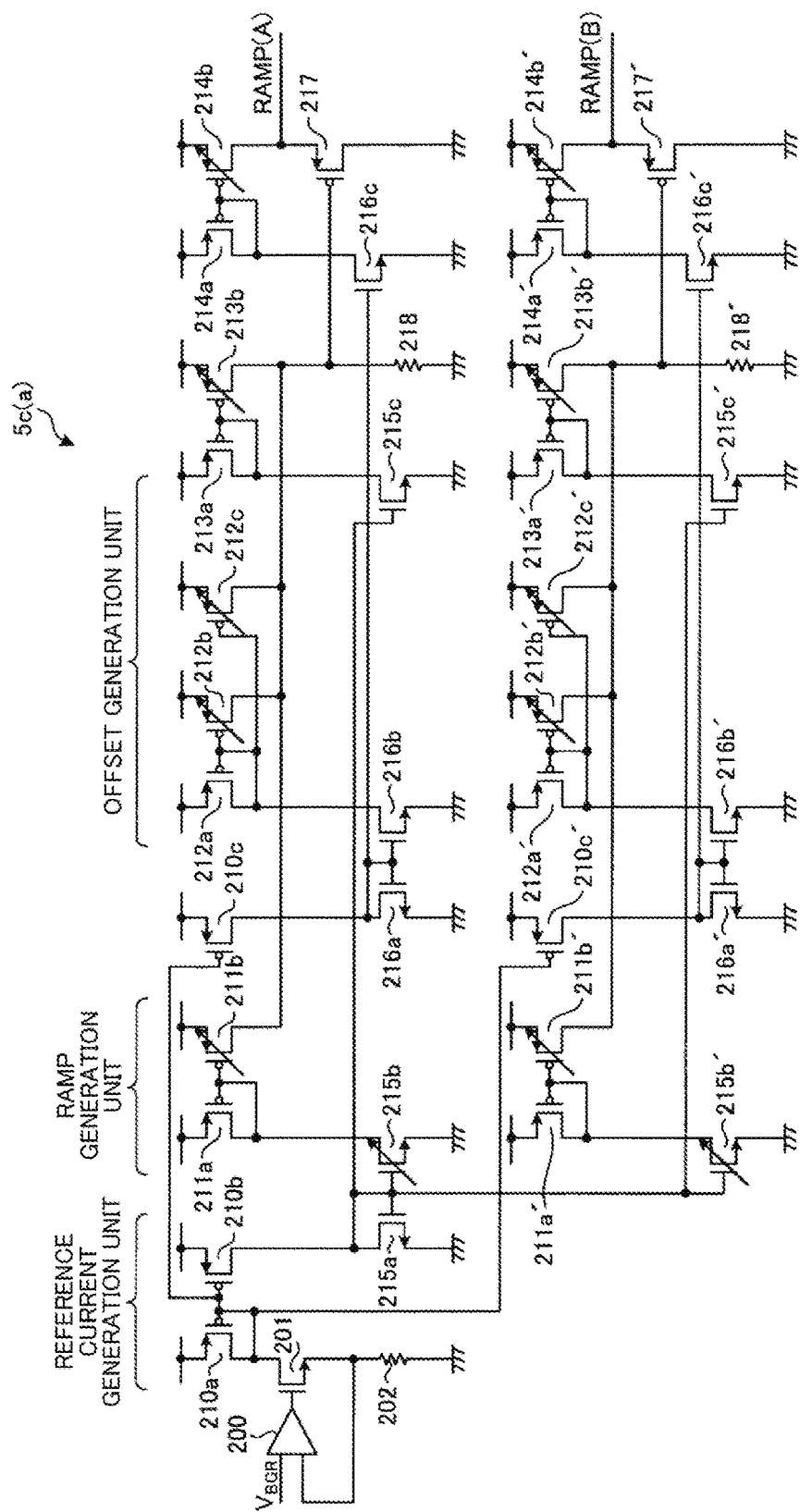
FIG. 18 is a circuit diagram showing a first example of a circuit capable of generating and outputting first and second reference signals applicable to the second embodiment.
Figure 19:
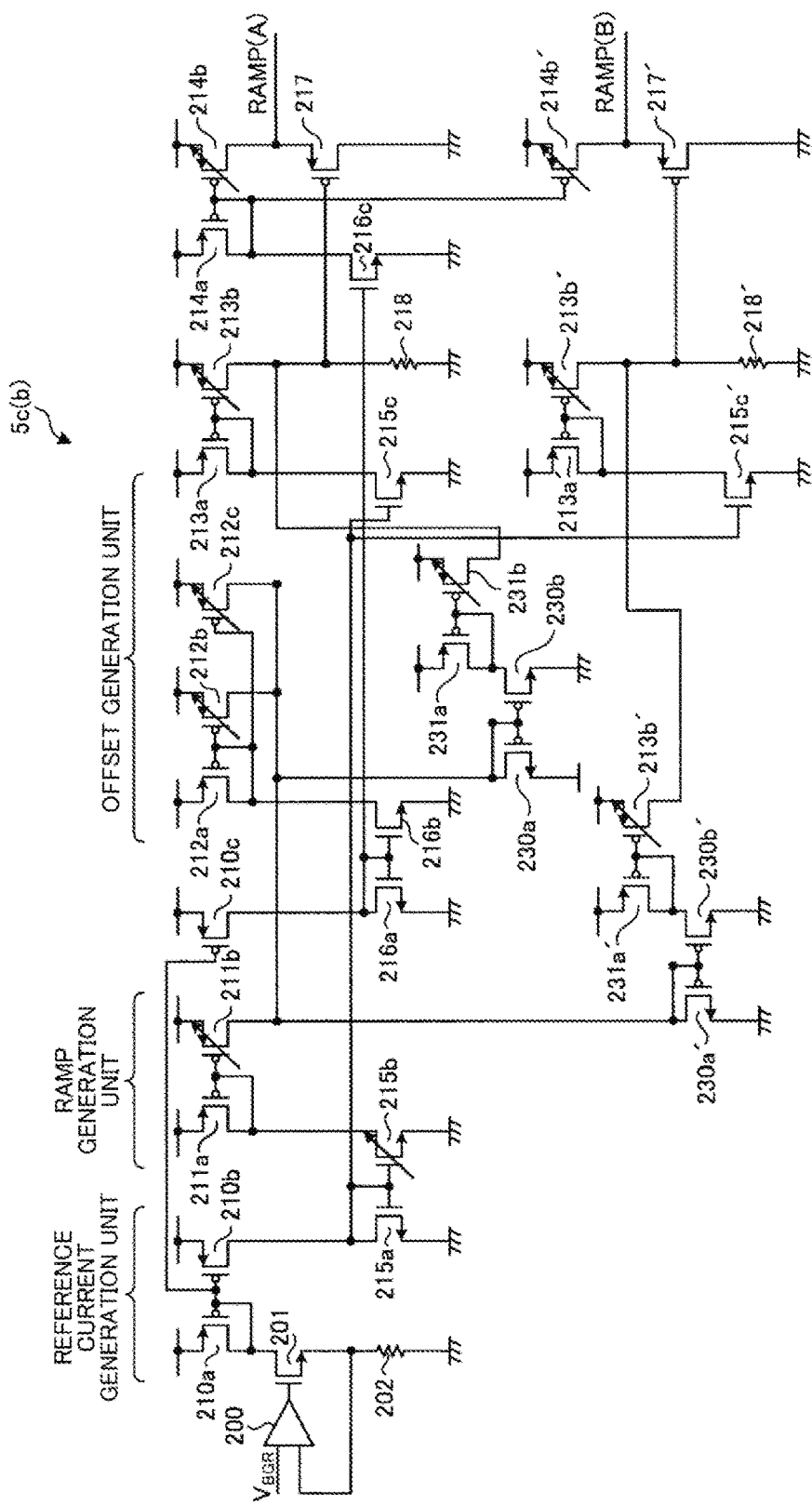
FIG. 19 is a circuit diagram showing a second example of the circuit capable of generating and outputting the first and second reference signals applicable to the second embodiment.
Figure 20:
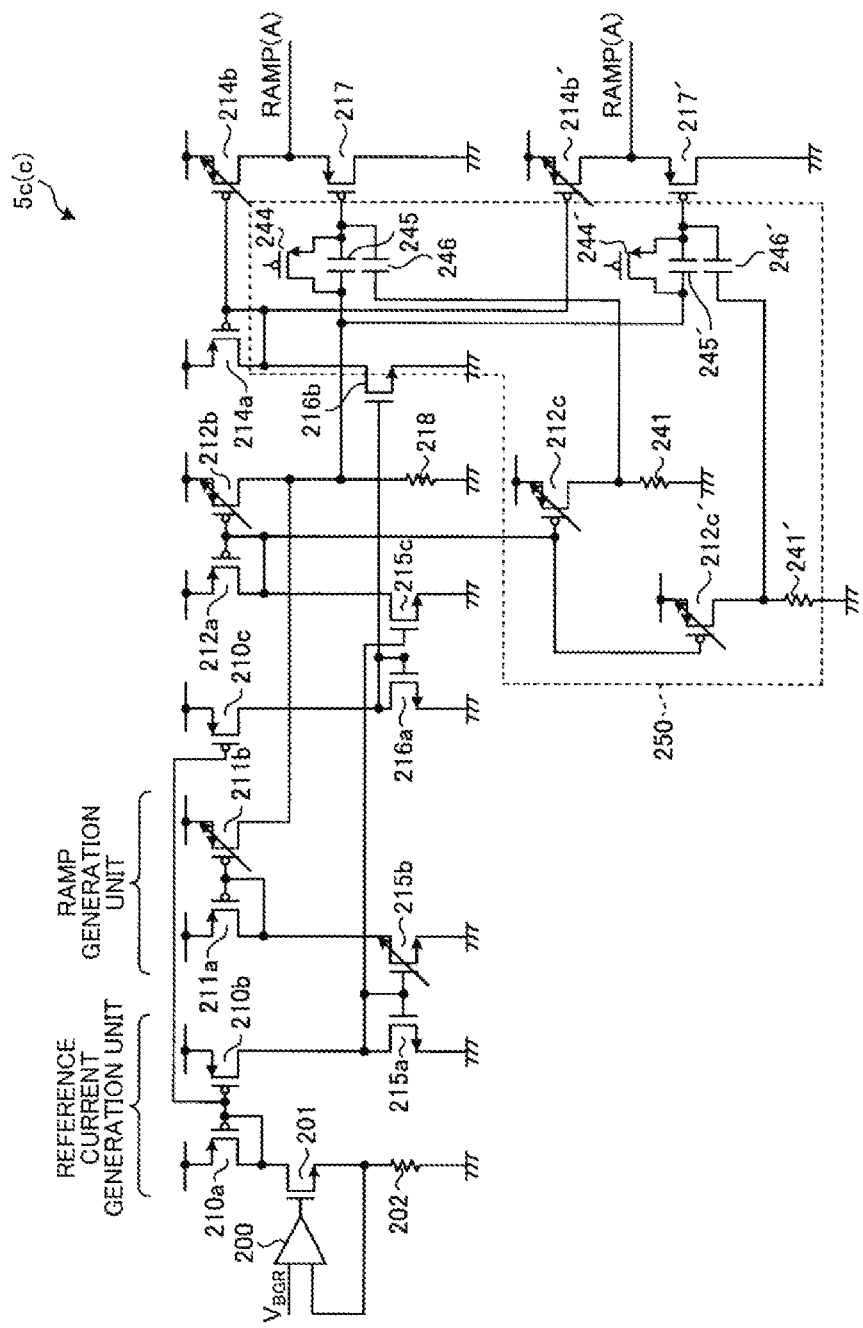
FIG. 20 is a circuit diagram showing a third example of the circuit capable of generating and outputting the first and second reference signals applicable to the second embodiment.

FIGS. 18 to 20 are circuit diagrams showing an example of a circuit capable of generating and outputting the first and second reference signals, which is applicable to the second embodiment. Also, DACs 5c(a), 5c(b), and 5c(d) shown in FIGS. 18 to 20 show examples in a case in which an offset voltage $V_{ofst}$ is applied to the reference signal.

FIG. 18 is a circuit diagram showing a first example of the circuit capable of generating and outputting the first and second reference signals, which is applicable to the second embodiment. In FIG. 18, the DAC 5c(a) roughly includes one reference current generation unit, and two DACs that are connected in parallel with each other and output the first reference signal (RAMP (A)) and the second reference signal (RAMP (B)), respectively. Each DAC includes a RAMP generation unit and an offset generation unit, and includes an output unit at a stage subsequent to the offset generation unit.

The reference current generation unit includes a transistor 201, which is an N-channel MOS transistor, a differential amplifier 200, and a resistor 202. A voltage $V_{BGR}$ of a constant voltage generated by a bandgap reference (BGR) circuit (not shown) as a constant voltage source is input to a positive electrode input end of the differential amplifier 200. The output of the differential amplifier 200 is input to the gate of the transistor 201. The source of the transistor 201 is connected to a ground potential via the resistor 202 and is connected to a negative electrode input end of the differential amplifier 200.

In such a configuration, the differential amplifier 200 controls potentials of both ends of the resistor 202 to coincide with the voltage $V_{BGR}$ output from the BGR circuit due to the negative feedback formed by connecting the drain of the transistor 201 to the negative electrode input end (−). A current flowing through the resistor 202 is a constant current, and this is used as a reference current Iref.

The drain of the transistor 201 is connected to the drain of a transistor 210a, which is a current duplication source of a current mirror circuit in which the transistor 210a, which is a P-channel MOS transistor, is the duplication source, and transistors 210b and 210c, which are P-channel MOS transistors, are duplication destinations, respectively. The reference current Iref is duplicated by this current mirror circuit. The drain of the transistor 210b, which is the duplication destination of the current mirror circuit, is connected to the drain of a transistor 215a, which is an N-channel MOS transistor.

A current mirror circuit in which a transistor 215a is a duplication source, and transistors 215b and 215c, which are N-channel MOS transistors, and transistors 215b' and 215c' are replication destinations is configured.

Here, the current duplicated from the reference current Iref by the transistors 215b and 215c will be a current used in the circuit for generating the first reference signal (RAMP (A)) shown on the upper side of FIG. 18. On the other hand, the current duplicated from the reference current Iref by the transistors 215b' and 215c' will be a current used in the circuit for generating the second reference signal (RAMP (B)) shown in the lower side of FIG. 18.

First, the circuit for generating the first reference signal (RAMP (A)) shown on the upper side of FIG. 18 will be described. The current duplicated from the reference current Iref by the transistor 215b is supplied to the current mirror circuit formed by transistors 211a and 211b that are P-channel MOS transistors, which are included in the RAMP generation unit on the upper side.

Further, the transistor 215b includes a predetermined number of N-channel MOS transistors connected in parallel and can control a current value of the duplicated current in accordance with the number of transistors to be turned on among the predetermined number of transistors.

Here, the transistor 211b included in the RAMP generation unit in the configuration related to the first reference signal (RAMP (A)) includes, for example, a number of P-channel MOS transistors connected in parallel corresponding to the gradation compared by the reference signal (RAMP (A)). In accordance with the control from the outside, for example, the overall control unit 7, the number of transistors to be turned on among the transistors included in the transistor 211b is sequentially decreased or increased in accordance with the clock signal, whereby an electric current that changes stepwise over time can be produced. As will be described later, this current is converted into a voltage by, for example, a resistor 218, and output via a transistor 217 subjected to source follower connection, which is a P-channel MOS transistor, whereby a reference signal whose voltage changes stepwise over time can be generated.

On the other hand, the drain of the transistor 210c is connected to the drain of a transistor 216a, which is an N-channel MOS transistor. A current mirror circuit in which the transistor 216a is a duplication source and transistors 216b and 216c, which are N-channel MOS transistors, are duplication destinations is configured.

The drain of the transistor 216b is connected to the drain of a transistor 212a, which is a P-channel MOS transistor. A current mirror circuit in which the transistor 212a is a duplication source and transistors 212b and 212c, which are P-channel MOS transistors, are duplication destinations is configured. The offset generation unit in the configuration related to the first reference signal (RAMP (A)) is configured to include the current mirror circuit formed by these transistor 212a and transistors 212b and 212c.

The drain of the transistor 215c is connected to the drain of a transistor 213a, which is a P-channel MOS transistor. A current mirror circuit in which the transistor 213a is a duplication source and a transistor 213b, which is a P-channel MOS transistor, is a duplication destination is configured. The drain of the transistor 213b is connected to one end of the resistor 218 which is a termination resistor. The other end of the resistor 218 is connected to a ground voltage.

The output of the RAMP generation unit in the configuration related to the first reference signal (RAMP (A)), that is, the drain of the transistor 211b is connected to the drains of the transistors 212b and 212c, which are duplication destinations of the current mirror circuit, included in the offset generation unit in the configuration related to the first reference signal (RAMP (A)). As a result, an offset can be applied by a current to the output of the RAMP generation unit in the configuration related to the first reference signal (RAMP (A)).

Here, the transistors 212b and 212c include, for example, a predetermined number of P-channel MOS transistors connected in parallel and can control a current value of the duplicated current in accordance with the number of transistors to be turned on among the predetermined number of transistors. By controlling the number of transistors to be turned on among the predetermined number of transistors included in the transistors 212b and 212c, it is possible to control an amount of the offset and the presence or absence of the offset.

The drain of the transistor 211b is further connected to a connection point to which the drain of the transistor 213b and the resistor 218 are connected. The connection point is further connected to the gate of the transistor 217, which is a P-channel MOS transistor. That is, the current flowing through the resistor 218 is converted into a voltage by the resistor 218, and this converted voltage is input to the gate of the transistor 217.

On the other hand, the drain of the transistor 216c is connected to the drain of a transistor 214a, which is a P-channel MOS transistor. A current mirror circuit in which the transistor 214a is a duplication source and a transistor 214b, which is a P-channel MOS transistor, is a duplication destination is configured. The source of the transistor 217 is connected to the drain of the transistor 214b in the current mirror circuit and constitutes a source follower using the current mirror circuit as a current source. An output voltage is taken out from the source of the transistor 217. This output voltage becomes the first reference signal (RAMP (A)).

Further, the transistor 214b includes, for example, a predetermined number of P-channel MOS transistors connected in parallel and can control a current value of the duplicated current in accordance with the number of transistors to be turned on among the predetermined number of transistors. As a result, a gain of the source follower due to the transistor 217 can be adjusted.

Also, the configuration for generating the first reference signal (RAMP (A)) described above is substantially the same as that of a general DAC for generating a reference signal.

Next, the circuit for generating the second reference signal (RAMP (B)) shown on the lower side of FIG. 18 will be described. This circuit has substantially the same configuration as the circuit for generating the first reference signal (RAMP (A)) shown on the upper side of FIG. 18 described above.

That is, the current duplicated from the reference current Iref by the transistor 215b' is supplied to the current mirror circuit formed by transistors 211a' and 211b' that are P-channel MOS transistors, which are included in the RAMP generation unit in the configuration related to the second reference signal (RAMP (B)).

Further, the transistor 215b' includes a predetermined number of N-channel MOS transistors connected in parallel and can control a current value of the duplicated current in accordance with the number of transistors to be turned on among the predetermined number of transistor Similarly to the transistor 211b described above, the transistor 211b' included in the RAMP generation unit in the configuration related to the second reference signal (RAMP (B)) includes, for example, the number of P-channel MOS transistors connected in parallel corresponding to the gradation compared by the reference signal (RAMP (A)). In accordance with the control, the number of transistors to be turned on among the transistors included in the transistor 211b is sequentially decreased or increased in accordance with the clock signal, whereby a current that changes stepwise over time can be produced. As will be described later, by converting this current into a voltage, for example, in a resistor 218' and outputting it via a transistor 217' subjected to source follower connection, which is a P-channel MOS transistor, the second reference signal (RAMP (B)) whose voltage changes stepwise over time can be generated.

On the other hand, the drain of a transistor 210c' is connected to the drain of a transistor 216a', which is an N-channel MOS transistor. A current mirror circuit in which the transistor 216a' is a duplication source and transistors 216b' and 216c', which are N-channel MOS transistors, are duplication destinations is configured.

The drain of the transistor 216b' is connected to the drain of a transistor 212a', which is a P-channel MOS transistor. A current mirror circuit in which the transistor 212a' is a duplication source and transistors 212b' and 212c', which are P-channel MOS transistors, are duplication destinations is configured.

The drain of the transistor 215c' is connected to the drain of a transistor 213a', which is a P-channel MOS transistor. A current mirror circuit in which the transistor 213a' is a duplication source and a transistor 213b', which is a P-channel MOS transistor, is a duplication destination is configured. The drain of the transistor 213b' is connected to one end of the resistor 218, which is a termination resistor. The other end of the resistor 218 is connected to a ground voltage.

The output of the RAMP generation unit in the configuration related to the second reference signal (RAMP (B)), that is, the drain of the transistor 211b, is connected to the drains of the transistors 212b' and 212c' that are duplication destinations of the current mirror circuit, which are included in the offset generation unit in the configuration related to the second reference signal (RAMP (B)). As a result, an offset can be applied by a current to the output of the RAMP generation unit in the configuration related to the second reference signal (RAMP (B)).

Here, the transistors 212b' and 212c' include, for example, a predetermined number of P-channel MOS transistors connected in parallel and can control a current value of the duplicated current in accordance with the number of transistors to be turned on among the predetermined number of transistors. By controlling the number of transistors to be turned on among the predetermined number of transistors included in the transistors 212b' and 212c', it is possible to control an amount of the offset and the presence or absence of the offset.

The drain of the transistor 211b' is further connected to a connection point to which the drain of the transistor 213b' and the resistor 218' are connected. The connection point is further connected to the gate of the transistor 217', which is a P-channel MOS transistor. That is, the current flowing through the resistor 218' is converted into a voltage by the resistor 218', and this converted voltage is input to the gate of the transistor 217'.

On the other hand, the drain of the transistor 216c' is connected to the drain of a transistor 214a', which is a P-channel MOS transistor. A current mirror circuit in which the transistor 214a' is a duplication source and a transistor 214b', which is a P-channel MOS transistor, is a duplication destination is configured. The source of the transistor 217' is connected to the drain of the transistor 214b' in the current mirror circuit and constitutes a source follower using the current mirror circuit as a current source. An output voltage is taken from the source of transistor 217'. This output voltage becomes the second reference signal (RAMP (B)).

Also, the transistor 214b' includes, for example, a predetermined number of P-channel MOS transistors connected in parallel and can control a current value of the duplicated current in accordance with the number of transistors to be turned on among the predetermined number of transistors. As a result, a gain of the source follower formed by the transistor 217' can be adjusted.

The first example shown in FIG. 18 has a high degree of freedom in control because it has the configurations after the reference current generation unit in parallel.

FIG. 19 is a circuit diagram showing a second example of the circuit capable of generating and outputting the first and second reference signals, which is applicable to the second embodiment. The DAC 5c(b) in the second example is an example in which the reference current generation unit and the RAMP generation unit are shared as compared with the DAC 5c(a) in the first example described above. In addition, in FIG. 19, the configurations of the reference current generation unit and the RAMP generation unit are the same as the configurations of the reference current generation unit and the RAMP generation unit in FIG. 18 described above, and thus the description thereof will be omitted here.

In the current mirror circuit formed by the transistors 210a and 210b, which duplicates the reference current Iref generated by the reference current generation unit, the drain of the transistor 210b is connected to the drain of the transistor 215a, which is an N-channel MOS transistor. A current mirror circuit in which the transistor 215a is a replication source, and the transistors 215b and 215c, which are N-channel MOS transistors, and the transistors 215b' and 215c' are replication destinations is configured.

The drain of the transistor 210c, which is a P-channel MOS transistor, constituting a current mirror circuit whose duplication source is the transistor 210a in the reference current generation unit is connected to the drain of the transistor 216a, which is an N-channel MOS transistor. A current mirror circuit in which the transistor 216a is a duplication source and the transistors 216b and 216c, which are N-channel MOS transistors, are duplication destinations is configured.

The drain of the transistor 216b is connected to the drain of the transistor 212a, which is a P-channel MOS transistor. A current mirror circuit in which the transistor 212a is a duplication source and the transistors 212b and 212c, which are P-channel MOS transistors, are duplication destinations is configured.

The drain of the transistor 215c is connected to the drain of the transistor 213a, which is a P-channel MOS transistor. A current mirror circuit in which the transistor 213a is a duplication source and the transistor 213b, which is a P-channel MOS transistor, is a replication destination is configured. The drain of the transistor 213b is connected to one end of the resistor 218, which is a termination resistor. The other end of the resistor 218 is connected to a ground voltage.

The output of the RAMP generation unit, that is, the drain of the transistor 211b, is connected to the drains of the transistors 212b and 212c, which are duplication destinations of the current mirror circuit. Further, the drain of the transistor 211b is connected to drains of transistors 230a and 230a', which are N-channel MOS transistors.

A current mirror circuit in which the transistor 230a is a duplication source and a transistor 230b, which is an N-channel MOS transistor, is a duplication destination is configured. The first reference signal (RAMP (A)) is generated on the basis of the output of the RAMP generation unit duplicated by the current mirror circuit formed by the transistors 230a' and 230b'.

Similarly, a current mirror circuit in which the transistor 230a' is a duplication source and the transistor 230b', which is an N-channel MOS transistor, is a duplication destination is configured. The second reference signal (RAMP (B)) is generated on the basis of the output of the RAMP generation unit duplicated by the current mirror circuit formed by the transistors 230a' and 230b'.

The drain of the transistor 230b is connected to the drain of a transistor 231a, which is a P-channel MOS transistor. A current mirror circuit in which the transistor 231a is a replication source and a transistor 231b, which is a P-channel MOS transistor, is a duplication destination is configured.

Here, the transistors 212b and 212c include, for example, a predetermined number of P-channel MOS transistors connected in parallel and can control a current value of the duplicated current in accordance with the number of transistors to be turned on among the predetermined number of transistors.

The drain of the transistor 231b is connected to a connection point to which the drain of the transistor 213b and one end of the resistor 218, which is a termination resistor, are connected. The other end of the resistor 218 is connected to a ground potential. The connection point is further connected to the gate of transistor 217, which is a P-channel MOS transistor. That is, the current flowing through the resistor 218 is converted into a voltage, and the converted voltage is supplied to the gate of the transistor 217.

On the other hand, the drain of the transistor 216c is connected to the drain of the transistor 214a, which is a P-channel MOS transistor. A current mirror circuit in which the transistor 214a is a replication source and the transistors 214b and 214b', which are P-channel MOS transistors, are duplication destinations is configured. The source of the transistor 217 is connected to the drain of the transistor 214b in the current mirror circuit and constitutes a source follower using the current mirror circuit as a current source. The transistor 214b includes, for example, a predetermined number of P-channel MOS transistors connected in parallel and can control a current value of the duplicated current in accordance with the number of transistors to be turned on among the predetermined number of transistors. As a result, the gain of the source follower by the transistor 217 can be adjusted. An output voltage is taken out from the source of the transistor 217. This output voltage becomes the first reference signal (RAMP (A)).

On the other hand, the drain of the transistor 230b' is connected to the drain of a transistor 231a', which is a P-channel MOS transistor. A current mirror circuit in which the transistor 231a' is a duplication source and a transistor 231b', which is a P-channel MOS transistor, is a duplication destination is configured.

The drain of the transistor 231b' is connected to a connection point to which the drain of the transistor 213b' and one end of the resistor 218', which is a termination resistor, are connected. The other end of the resistor 218' is connected to a ground potential. The connection point is further connected to the gate of transistor 217', which is a P-channel MOS transistor. That is, the current flowing through the resistor 218' is converted into a voltage, and the converted voltage is supplied to the gate of the transistor 217'.

The transistor 217' is connected to the drain of the transistor 214b', which is a duplication destination, in the current mirror circuit whose source uses the transistor 214a as a duplication source and constitutes a source follower that uses the current mirror circuit formed by the transistors 214a and 214b' as a current source. The transistor 214b' includes, for example, a predetermined number of P-channel MOS transistors connected in parallel and can control a current value of the duplicated current in accordance with the number of transistors to be turned on among the predetermined number of transistors. As a result, the gain of the source follower by the transistor 217' can be adjusted. An output voltage is taken out from the source of the transistor 217'. This output voltage becomes the second reference signal (RAMP (B)).

In the above configuration, the transistors 231b and 231b' to which the output of the RAMP generation unit is supplied include, for example, a predetermined number of P-channel MOS transistors connected in parallel and can control a current value of the duplicated current in accordance with the number of transistors to be turned on among the predetermined number of transistors.

The number of transistors to be turned on among the predetermined number of transistors included in the transistor 231b and the number of transistors to be turned on among the predetermined number of transistors included in the transistor 231b' can be controlled independently. As a result, it is possible to independently control an amount of the offset and the presence or absence of the offset of the first reference signal (RAMP (A)) and the second reference signal (RAMP (B)).

The second example shown in FIG. 19 can be configured with a smaller number of elements as compared with the configuration according to the first example shown in FIG. 18.

FIG. 20 is a circuit diagram showing a third example of the circuit capable of generating and outputting the first and second reference signals, which is applicable to the second embodiment. The DAC 5c(c) in the third example divides the output of the RAMP generation unit into two branches in the conversion unit that converts the output into a voltage and applies an offset voltage to each voltage which is converted from the output of the RAMP generation unit, thereby outputting the first reference signal (RAMP (A)) and the second reference signal (RAMP (B)).

Also, in FIG. 20, the configurations of the reference current generation unit and the RAMP generation unit are the same as the configurations of the reference current generation unit and the RAMP generation unit in FIG. 18 described above, and thus the description thereof will be omitted here.

In the current mirror circuit formed by the transistors 210a and 210b, which duplicates the reference current Iref generated by the reference current generation unit, the drain of the transistor 210b is connected to the drain of the transistor 215a, which is an N-channel MOS transistor. A current mirror circuit in which the transistor 215a is a duplication source and the transistors 215b and 215c, which are N-channel MOS transistors, are duplication destinations is configured.

The drain of the transistor 210c, which is a P-channel MOS transistor, constituting the current mirror circuit whose duplication source is the transistor 210a in the reference current generation unit is connected to the drain of the transistor 216a, which is an N-channel MOS transistor. A current mirror circuit in which the transistor 216a is a duplication source and the transistor 216b, which is an N-channel MOS transistor, is a duplication destination is configured.

The drain of the transistor 216b is connected to the drain of the transistor 214a, which is a P-channel MOS transistor. A current mirror circuit in which the transistor 214a is a duplication source and the transistors 214b and 214b', which are P-channel MOS transistors, are duplication destinations is configured. The drain of transistor 214b is connected to the source of transistor 217. Further, the drain of the transistor 214b' is connected to the source of the transistor 217'.

Also, the transistors 214b and 214b' include, for example, a predetermined number of P-channel MOS transistors connected in parallel and can control a current value of the duplicated current in accordance with the number of transistors to be turned on among the predetermined number of transistors.

The drain of the transistor 215c is connected to the drain of the transistor 212a, which is a P-channel MOS transistor. A current mirror circuit in which the transistor 212a is a duplication source and the transistors 212b, 212c, and 212c', which are P-channel MOS transistors, are duplication destinations is configured. The drain of the transistor 212b is connected to one end of the resistor 218, which is a termination resistor. The other end of the resistor 218 is connected to a ground voltage.

The output of the RAMP generation unit, that is, the drain of the transistor 211b, is connected to a connection point to which the transistor 212b and the resistor 218 are connected. Further, one end of a capacitor 245 related to the first reference signal (RAMP (A)) and the drain of a transistor 244, which is the P-channel MOS transistor, are connected to the connection point. The source of the transistor 244 is connected to the other end of the capacitor 245. Furthermore, one end of a capacitor 245' related to the second reference signal (RAMP (B)) and the drain of a transistor 244', which is the P-channel MOS transistor, are connected to the connection point. The source of the transistor 244' is connected to the other end of the capacitor 245'.

The drain of the transistor 212c is connected to one end of a resistor 241 and the other end of the resistor 241 is connected to a ground voltage. One end of a capacitor 246 is connected to a connection point to which the drain of the transistor 212c and the resistor 241 are connected. The other end of the capacitor 246 is connected to a connection point between the other end of the capacitor 245 and the source of the transistor 244. Further, the gate of the transistor 217, which is the P-channel MOS transistor, is connected to the connection point.

Here, the capacitors 245 and 246 constitute an adder in which a voltage supplied to one end of each of the capacitors 245 and 246 is added (or subtracted), and the added voltage is taken out from a connection point to which the other end thereof is connected. A voltage obtained by adding a voltage, which is obtained by converting the output of the RAMP generation unit using the resistor 218, and a voltage, which is taken out from a connection point to which the transistor 212c and the resistor 241 are connected, in the adder is input to the gate of the transistor 217. In addition, the capacitor 245 is refreshed by controlling the transistor 244 whose drain is connected to one end of the capacitor 245 and source is connected to the other end thereof in an on state.

The source of the transistor 217 is connected to the drain of the transistor 214b in a current mirror circuit in which the transistor 214a is a duplication source and the transistor 214b is a duplication destination. The transistor 217 constitutes a source follower using this current mirror circuit as a current source. The transistor 214b includes, for example, a predetermined number of P-channel MOS transistors connected in parallel and can control a current value of the duplicated current in accordance with the number of transistors to be turned on among the predetermined number of transistors. As a result, the gain of the source follower by the transistor 217 can be adjusted.

An output voltage in accordance with the voltage obtained by adding the voltage, which is obtained by converting the output of the RAMP generation unit using the resistor 218, and the voltage, which is taken out from the connection point to which the transistor 212c and the resistor 241 are connected is taken out from the source of the transistor 217. The voltage taken out from the transistor 217 becomes the first reference signal (RAMP (A)).

The drain of the transistor 212c' is connected to one end of a resistor 241', and the other end of the resistor 241' is connected to a ground voltage. One end of a capacitor 246' is connected to a connection point to which the drain of the transistor 212c' and the resistor 241' are connected. The other end of the capacitor 246' is connected to a connection point between the other end of the capacitor 245' and the source of the transistor 244'. Further, the gate of the transistor 217', which is a MOS transistor of the P channel, is connected to the connection point.

Similarly to the above, the capacitors 245' and 246' constitute an adder in which a voltage supplied to one end of each of the capacitors 245' and 246' is added (or subtracted), and the added voltage is taken out from a connection point to which the other end thereof is connected. A voltage obtained by adding a voltage, which is obtained by converting the output of the RAMP generation unit using the resistor 218', and a voltage, which is taken out from a connection point to which the transistor 212c' and the resistor 241' are connected, in the adder is input to the gate of the transistor 217'. In addition, the capacitor 245' is refreshed by controlling the transistor 244' whose drain is connected to one end of the capacitor 245' and whose source is connected to the other end thereof in an on state.

The source of the transistor 217' is connected to the drain of the transistor 214b' in a current mirror circuit in which the transistor 214a is a duplication source and the transistor 214b' is a duplication destination. The transistor 217' constitutes a source follower using this current mirror circuit as a current source. The transistor 214b' includes, for example, a predetermined number of P-channel MOS transistors connected in parallel and can control a current value of the duplicated current in accordance with the number of transistors to be turned on among the predetermined number of transistors. As a result, the gain of the source follower by the transistor 217' can be adjusted.

An output voltage in accordance with the voltage obtained by adding the voltage, which is obtained by converting the output of the RAMP generation unit using the resistor 218', and the voltage, which is taken out from the connection point to which the transistor 212c' and the resistor 241' are connected is taken out from the source of the transistor 217'. The voltage taken out from the transistor 217' becomes the second reference signal (RAMP (B)).

In the above configuration, the transistors 212c and 212c' to which the output of the RAMP generation unit is supplied include, for example, a predetermined number of P-channel MOS transistors connected in parallel and can control a current value of the duplicated current in accordance with the number of transistors to be turned on among the predetermined number of transistors. As a result, the voltage taken out from the connection point to which the transistor 212c and the resistor 241 are connected and the voltage taken out from the connection point to which the transistor 212c' and the resistor 241' are connected are also controlled.

The number of transistors to be turned on among the predetermined number of transistors included in the transistor 212c and the number of transistors to be turned on among the predetermined number of transistors included in the transistor 212c' can be controlled independently. As a result, it is possible to independently control an amount of the offset and the presence or absence of the offset of the first reference signal (RAMP (A)) and the second reference signal (RAMP (B)).

Third Embodiment

Figure 21:
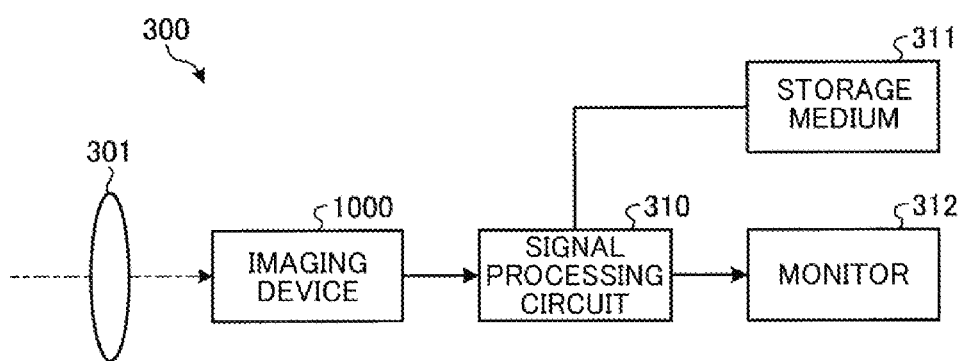
FIG. 21 is a block diagram showing a configuration of an example of an electronic device according to a third embodiment.

Next, a third embodiment of the present disclosure will be described. In the third embodiment, an example of a configuration of an electronic device to which the techniques according to the first embodiment, its modified examples, and the second embodiment described above are applied will be described. FIG. 21 is a block diagram showing a configuration of an example of the electronic device according to the third embodiment.

Figure 22:
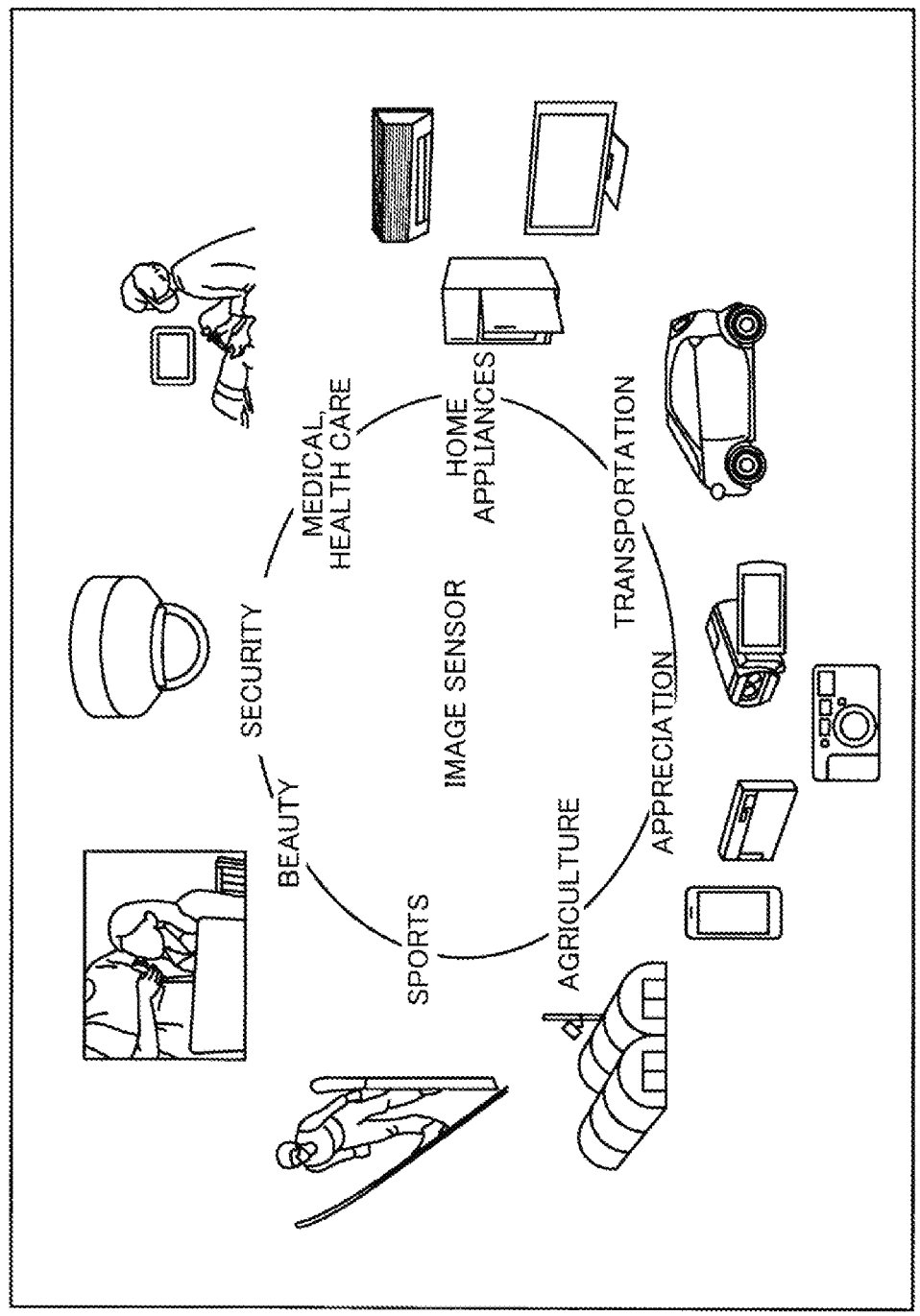
FIG. 22 is a diagram explaining a usage example of an imaging device to which the technique of the present disclosure is applied.

In FIG. 21, an electronic device 300 includes an optical system 301, the imaging device 1000, a signal processing circuit 310, a storage medium 311, and a monitor 312. In FIG. 22, here, as the electronic device 300, a digital still camera, a digital video camera, a mobile phone having an imaging function, a smartphone, or the like can be adopted.

The optical system 301 forms an image of image light (incident light) from a subject on an imaging surface of the imaging device 1000. As a result, a signal charge is accumulated in the imaging device 1000 for a certain period of time. The signal processing circuit 310 performs various signal processing on the signal output from the imaging device 1000. A video signal processed by signal processing can be stored in the storage medium 311 such as a memory. Further, the video signal can be output to the monitor 312.

Fourth Embodiment

Next, as a fourth embodiment, an application example of the imaging device 1000 according to the first embodiment, its modified examples, and the second embodiment of the present disclosure will be described. FIG. 22 is a diagram showing a usage example using the imaging device 1000 according to the first embodiment, its modified examples, and the second embodiment described above.

The above-mentioned imaging device 1000 can be used in various cases for sensing light such as visible light, infrared light, ultraviolet light, and X-ray, as described below.

- Devices that capture images used for viewing, such as digital cameras and mobile devices with camera functions.
- Devices used for transportation such as in-vehicle sensors that photograph the front, rear, surroundings, and interior of automobiles, surveillance cameras that monitor traveling vehicles and roads, ranging sensors that perform ranging between vehicles, and the like, for safe driving such as automatic stop and recognition of a driver's condition, etc.
- Devices used for home appliances such as TVs, refrigerators, and air conditioners in order to photograph a user's gesture and perform device operations in accordance with the gesture.
- Devices used for medical treatment and healthcare, such as endoscopes and devices that perform angiography by receiving infrared light.
- Devices used for security, such as surveillance cameras for crime prevention and cameras for personal authentication.
- Devices used for beauty, such as a skin measuring device that photographs the skin and a microscope that photographs the scalp.
- Devices used for sports, such as action cameras and wearable cameras for sports applications.
- Devices used for agriculture such as cameras for monitoring the condition of fields and crops.

Further Application Examples of Technique According to Present Disclosure

The technique according to the present disclosure (the present technique) can be applied to various products. For example, the technique according to the present disclosure may be applied to endoscopic surgery systems.

(Example of Application to In-Vivo Information Acquisition System)

Figure 23:
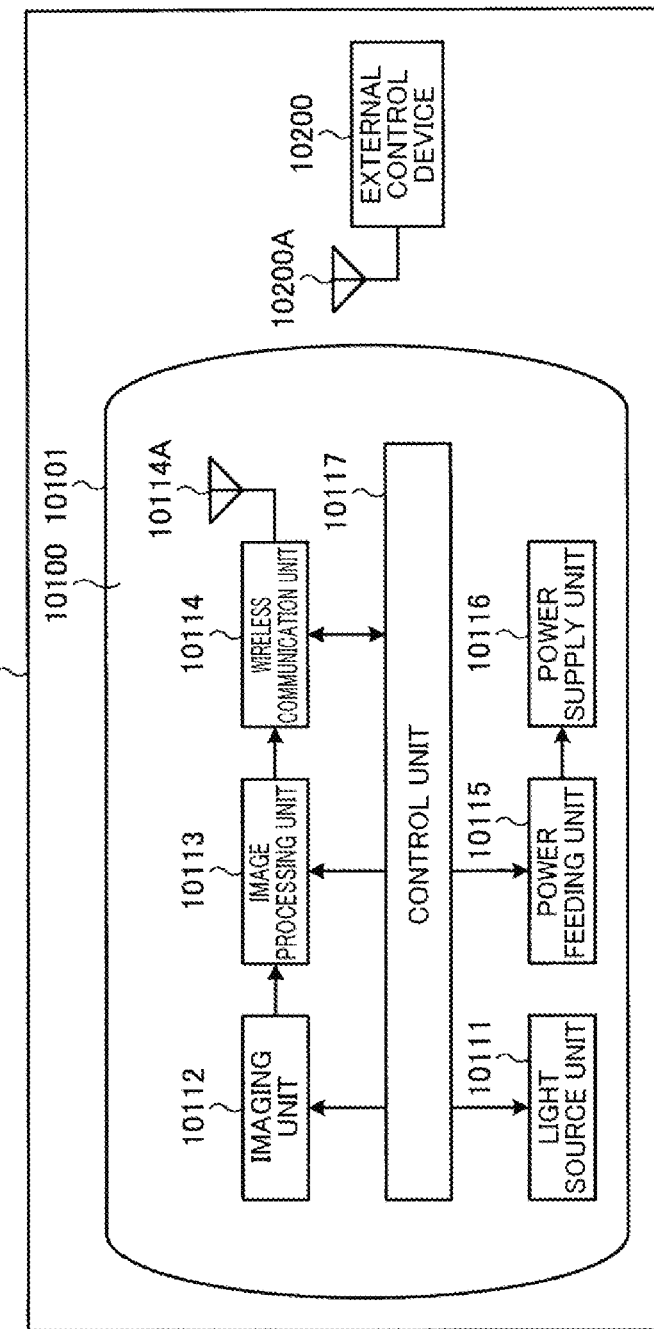
FIG. 23 is a block diagram showing an example of a schematic configuration of an in-vivo information acquisition system.

FIG. 23 is a block diagram showing an example of a schematic configuration of a patient's in-vivo information acquisition system using a capsule endoscope to which the technique according to the present disclosure (the present technique) can be applied.

An in-vivo information acquisition system 10001 is configured of a capsule endoscope 10100 and an external control device 10200.

The capsule endoscope 10100 is swallowed by a patient at the time of examination. The capsule endoscope 10100 has an imaging function and a wireless communication function, sequentially captures images inside organs (hereinafter, also referred to as in-vivo images) such as the stomach and intestines at predetermined intervals while moving inside organs by peristaltic movement until it is naturally excreted from the patient, and sequentially wirelessly transmits information about the in-vivo images to the external control device 10200 outside the body.

The external control device 10200 comprehensively controls operations of the in-vivo information acquisition system 10001. Further, the external control device 10200 receives the information about the in-vivo images transmitted from the capsule endoscope 10100 and generates image data for displaying the in-vivo images on a display device (not shown) on the basis of the received information about the in-vivo images.

In the in-vivo information acquisition system 10001, in this way, it is possible to obtain in-vivo images of the inside of the patient at any time from the time when the capsule endoscope 10100 is swallowed until it is discharged.

Configurations and functions of the capsule endoscope 10100 and the external control device 10200 will be described in more detail.

The capsule endoscope 10100 has a capsule type housing 10101, and a light source unit 10111, an imaging unit 10112, an image processing unit 10113, a wireless communication unit 10114, a power feeding unit 10115, a power supply unit 10116, and a control unit 10117 are accommodated in the housing 10101.

The light source unit 10111 is configured of, for example, a light source such as a light emitting diode (LED), and irradiates an imaging visual field of the imaging unit 10112 with light.

The imaging unit 10112 is configured of an imaging element and an optical system including a plurality of lenses provided in front of the imaging element. The reflected light (hereinafter referred to as observation light) of the light applied to body tissue, which is an observation target, is collected by the optical system and incident on the imaging element. In the imaging unit 10112, the observation light incident on the imaging element is photoelectrically converted, and an image signal corresponding to the observation light is generated. The image signal generated by the imaging unit 10112 is provided to the image processing unit 10113.

The image processing unit 10113 is configured of a processor such as a central processing unit (CPU) or a graphics processing unit (GPU), and performs various signal processing on the image signal generated by the imaging unit 10112. The image processing unit 10113 provides the image signal subjected to the signal processing to the wireless communication unit 10114 as RAW data.

The wireless communication unit 10114 performs a predetermined processing such as a modulation processing on the image signal subjected to the signal processing by the image processing unit 10113, and transmits the resultant image signal to the external control device 10200 via an antenna 10114A. Further, the wireless communication unit 10114 receives a control signal regarding drive control of the capsule endoscope 10100 from the external control device 10200 via the antenna 10114A. The wireless communication unit 10114 provides the control signal received from the external control device 10200 to the control unit 10117.

The power feeding unit 10115 is configured of, for example, a power reception antenna coil, a power regeneration circuit that regenerates electric power from a current generated in the antenna coil, a boosting circuit, and the like. The power feeding unit 10115 generates electric power using a so-called non-contact charging principle.

The power supply unit 10116 is configured of a secondary battery and stores electric power generated by the power feeding unit 10115. Although arrows indicating power supply destinations from the power supply unit 10116 are omitted in FIG. 27 in order to avoid making the drawings complicated, the electric power stored in the power supply unit 10116 can be supplied to the light source unit 10111, the imaging unit 10112, the image processing unit 10113, the wireless communication unit 10114, and the control unit 10117 and be used to drive these.

The control unit 10117 is configured of a processor such as a CPU and appropriately controls the driving of the light source unit 10111, the imaging unit 10112, the image processing unit 10113, the wireless communication unit 10114, and the power feeding unit 10115 in accordance with the control signal transmitted from the external control device 10200

The external control device 10200 is configured of a processor such as a CPU or GPU, or a microcomputer or a control board on which a processor and a storage element such as a memory are mounted together. The external control device 10200 transmits control signals to the control unit 10117 of the capsule endoscope 10100 via an antenna 10200A to control operations of the capsule endoscope 10100. In the capsule endoscope 10100, for example, light irradiation conditions for the observation target in the light source unit 10111 may be changed in accordance with the control signals from the external control device 10200. Further, imaging conditions (for example, a frame rate, an exposure value, and the like in the imaging unit 10112) may be changed in accordance with the control signals from the external control device 10200. Further, the content of processing in the image processing unit 10113 or conditions (for example, a transmission interval, the number of transmission images, and the like) for the wireless communication unit 10114 transmitting image signals may also be changed in accordance with the control signals from the external control device 10200.

Further, the external control device 10200 performs various image processing on the image signals transmitted from the capsule endoscope 10100 and generates image data for displaying the captured in-vivo images on the display device. As the image processing, for example, various signal processing such as development processing (demosaic processing), high image quality processing (band enhancement processing, super-resolution processing, noise reduction processing, camera shake correction processing, etc.), enlargement processing (electronic zoom processing), and the like are performed independently or in combination. The external control device 10200 controls the driving of the display device to display the captured in-vivo images on the basis of the generated image data. Alternatively, the external control device 10200 may cause the generated image data to be recorded in a recording device (not shown) or may cause the image data to be printed and output by a printing device (not shown).

The example of the in-vivo information acquisition system to which the technique according to the present disclosure can be applied has been described above. The technique of the present disclosure can be applied to, for example, the imaging unit 10112 among the configurations described above. By applying the technique according to the present disclosure to the imaging unit 10112, it is possible to inhibit the instantaneous current in a case in which the imaging unit 10112 photographs a flat subject, which makes it possible to reduce a size of the capsule endoscope 10100.

Application Example to Endoscopic Surgery System

Figure 24:
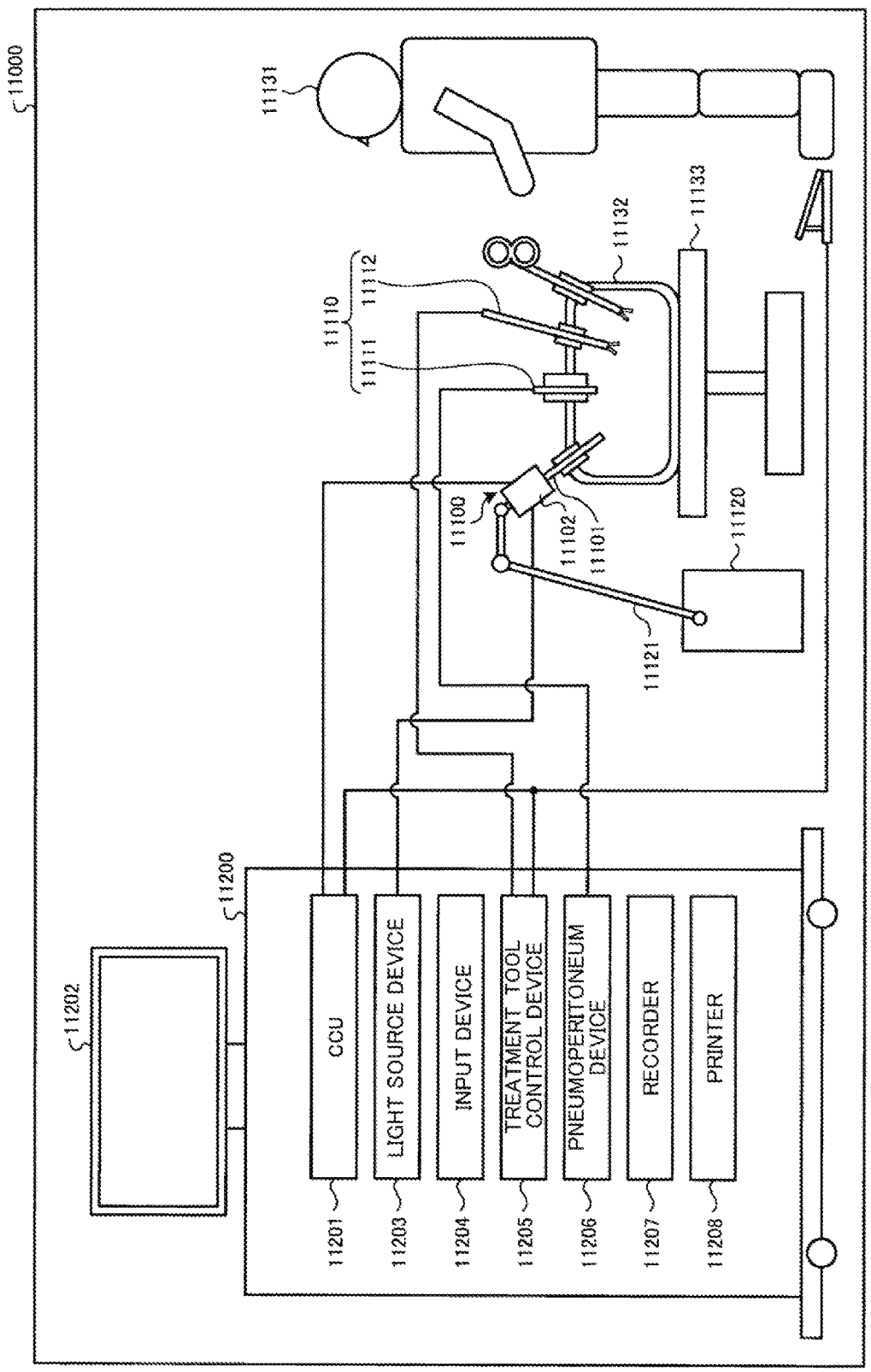
FIG. 24 is a diagram showing an example of a schematic configuration of an endoscopic surgery system.

The technique according to the present disclosure may be further applied to an endoscopic surgery system. FIG. 24 is a diagram showing an example of a schematic configuration of an endoscopic surgery system to which the technique according to the present disclosure (the present technique) may be applied.

FIG. 24 shows a situation in which an operator (doctor) 11131 is performing an operation on a patient 11132 on a patient bed 11133 using the endoscopic surgery system 11000. As shown, the endoscopic surgery system 11000 is configured of an endoscope 11100, other surgical instruments 11110 such as a pneumoperitoneum tube 11111 and an energy treatment instrument 11112, a support arm device 11120 that supports the endoscope 11100, and a cart 11200 equipped with various devices for endoscopic surgery.

The endoscope 11100 is configured of a lens barrel 11101 of which a region having a predetermined length from a tip is inserted into a body cavity of the patient 11132, and a camera head 11102 connected to a base end of the lens barrel 11101. Although the endoscope 11100 configured as a so-called rigid mirror having the rigid lens barrel 11101 is illustrated in the illustrated example, the endoscope 11100 may be configured as a so-called flexible mirror having a flexible lens barrel.

An opening in which an objective lens is fitted is provided at the tip of the lens barrel 11101. A light source device 11203 is connected to the endoscope 11100, and the light generated by the light source device 11203 is guided to the tip of the lens barrel 11101 by a light guide extending inside the lens barrel and is radiated toward the observation target in the body cavity of the patient 11132 via the objective lens. The endoscope 11100 may be a direct-viewing endoscope or may be a perspective endoscope or a side-viewing endoscope.

An optical system and an imaging element are provided inside the camera head 11102, and the reflected light (observation light) from the observation target is condensed on the imaging element by the optical system. The observation light is photoelectrically converted by the imaging element, and an electrical signal corresponding to the observation light, that is, an image signal corresponding to an observation image, is generated. The image signal is transmitted to a camera control unit (CCU) 11201 as RAW data.

The CCU 11201 is configured of a CPU, a GPU, and the like, and generally controls operations of the endoscope 11100 and the display device 11202. Further, the CCU 11201 receives an image signal from the camera head 11102, and performs, on the image signal, various image processing such as development processing (demosaic processing) for displaying an image based on the image signal, for example.

The display device 11202 displays the image based on the image signal subjected to the image processing by the CCU 11201 under the control of the CCU 11201.

The light source device 11203 is configured of a light source such as a light emitting diode (LED), and supplies the endoscope 11100 with irradiation light for photographing a surgical part or the like.

An input device 11204 is an input interface for the endoscopic surgery system 11000. The user can input various types of information or instructions to the endoscopic surgery system 11000 via the input device 11204. For example, the user inputs an instruction to change imaging conditions (a type of irradiation light, a magnification, a focal length, or the like) of the endoscope 11100.

A treatment tool control device 11205 controls the driving of the energy treatment instrument 11112 for ablation or incision of tissue, sealing of blood vessels, and the like. A pneumoperitoneum device 11206 delivers a gas into the body cavity of the patient 11132 via the pneumoperitoneum tube 11111 in order to inflate the body cavity of the patient 11132 for the purpose of securing a visual field with the endoscope 11100 and a working space of the operator. A recorder 11207 is a device capable of recording various types of information regarding surgery. A printer 11208 is a device capable of printing various types of information regarding surgery in various formats such as text, images, or graphs.

Further, the light source device 11203 that supplies the endoscope 11100 with the irradiation light for photographing the surgical part can be configured of, for example, an LED, a laser light source, or a white light source configured of a combination thereof. In a case in which a white light source is configured by a combination of RGB laser light sources, an output intensity and an output timing of each color (each wavelength) can be controlled with high accuracy, and thus the light source device 11203 can adjust white balance of the captured image. Further, in this case, the observation target is irradiated with laser light from each of the RGB laser light sources in a time-division manner, and the driving of the imaging element of the camera head 11102 is controlled in synchronization with the irradiation timing, whereby the images corresponding to each of RGB can be captured in a time-division manner. According to this method, it is possible to obtain a color image without providing a color filter to the imaging element.

Further, the driving of the light source device 11203 may be controlled to change the intensity of the output light at predetermined time intervals. By controlling the driving of the imaging element of the camera head 11102 in synchronization with a changing timing of the intensity of the light, acquiring images in a time division manner, and synthesizing the images, it is possible to generate an image with a high dynamic range without so-called blackout and overexposure.

Further, the light source device 11203 may be configured to be able to supply light in a predetermined wavelength band corresponding to special light observation. In the special light observation, for example, by utilizing the wavelength dependence of light absorption in the body tissue to radiate light in a narrower band than the irradiation light (that is, white light) during normal observation, a so-called narrow band light observation (narrow band imaging), in which a predetermined tissue such as a blood vessel on a mucosal surface layer is photographed with high contrast, is performed. Alternatively, in the special light observation, fluorescence observation in which an image is obtained using fluorescence generated by irradiation with excitation light may be performed. In the fluorescence observation, for example, it is possible to irradiate the body tissue with excitation light and observe the fluorescence from the body tissue (autofluorescence observation), or to locally inject a reagent such as indocyanine green (ICG) into the body tissue and irradiate the body tissue with excitation light corresponding to the fluorescence wavelength of the reagent to obtain a fluorescence image. The light source device 11203 may be configured to be able to supply narrower band light and/or excitation light corresponding to such special light observation.

Figure 25:
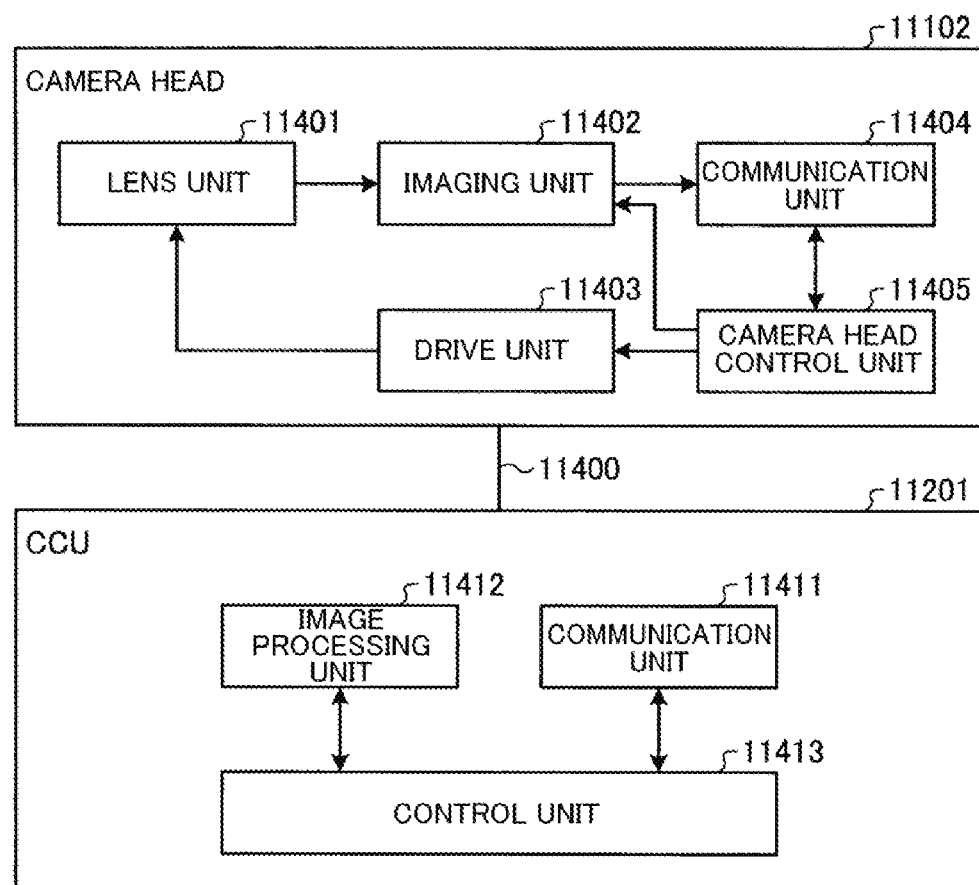
FIG. 25 is a block diagram showing an example of functional configurations of a camera head and a CCU.

FIG. 25 is a block diagram showing an example of a functional configuration of the camera head 11102 and CCU 11201 shown in FIG. 24.

The camera head 11102 includes a lens unit 11401, an imaging unit 11402, a drive unit 11403, a communication unit 11404, and a camera head control unit 11405. The CCU 11201 has a communication unit 11411, an image processing unit 11412, and a control unit 11413. The camera head 11102 is connected to the CCU 11201 to be able to communicate with each other via a transmission cable 11400.

The lens unit 11401 is an optical system provided at a portion connected to the lens barrel 11101. The observation light introduced from the tip of the lens barrel 11101 is guided to the camera head 11102 and incident on the lens unit 11401. The lens unit 11401 is configured by combining a plurality of lenses including a zoom lens and a focus lens.

The imaging unit 11402 includes an imaging element. The number of imaging elements constituting the imaging unit 11402 may be one (so-called single-plate type) or plural (so-called multi-plate type). In a case in which the imaging unit 11402 is configured as a multi-plate type, for example, image signals corresponding to R, G, and B, may be generated by the respective imaging elements and may be combined to obtain a color image. Alternatively, the imaging unit 11402 may be configured to have a pair of imaging elements for respectively acquiring image signals for a right eye and a left eye corresponding to a three-dimensional (3D) display. By performing 3D display, the operator 11131 can more accurately ascertain a depth of biological tissue in the surgical part. Also, in a case in which the imaging unit 11402 is configured as a multi-plate type, a plurality of lens units 11401 may be provided to correspond to the respective imaging elements.

Further, the imaging unit 11402 may not necessarily be provided in the camera head 11102. For example, the imaging unit 11402 may be provided immediately after the objective lens inside the lens barrel 11101.

The drive unit 11403 is configured of an actuator, and moves the zoom lens and the focus lens of the lens unit 11401 by a predetermined distance along an optical axis under the control of the camera head control unit 11405. Accordingly, the magnification and focus of the image captured by the imaging unit 11402 can be adjusted appropriately.

The communication unit 11404 is configured of a communication device for transmitting or receiving various information to or from the CCU 11201. The communication unit 11404 transmits the image signal obtained from the imaging unit 11402 as RAW data to the CCU 11201 via the transmission cable 11400.

Further, the communication unit 11404 receives a control signal for controlling the driving of the camera head 11102 from the CCU 11201 and supplies the control signal to the camera head control unit 11405. The control signal includes, for example, information on imaging conditions such as information to specify a frame rate of a captured image, information to specify an exposure value at the time of imaging, and/or information to specify a magnification and a focal point of a captured image, etc.

Further, the imaging conditions such as the frame rate, the exposure value, the magnification, and the focal point may be appropriately specified by the user, or may be automatically set by the control unit 11413 of the CCU 11201 on the basis of an acquired image signal. In the latter case, a so-called auto exposure (AE) function, auto focus (AF) function, and auto white balance (AWB) function are incorporated in the endoscope 11100.

The camera head control unit 11405 controls the driving of the camera head 11102 on the basis of the control signal from the CCU 11201 received via the communication unit 11404.

The communication unit 11411 is configured of a communication device for transmitting and receiving various information to and from the camera head 11102. The communication unit 11411 receives an image signal transmitted from the camera head 11102 via the transmission cable 11400.

Further, the communication unit 11411 transmits a control signal for controlling the driving of the camera head 11102 to the camera head 11102. The image signal and the control signal can be transmitted via electric communication, optical communication, or the like.

The image processing unit 11412 performs various image processing on the image signal that is the RAW data transmitted from the camera head 11102.

The control unit 11413 performs various controls regarding imaging of the surgical part or the like using the endoscope 11100 and displaying of a captured image obtained by imaging the surgical part or the like. For example, the control unit 11413 generates a control signal for controlling the driving of the camera head 11102.

Further, the control unit 11413 causes the display device 11202 to display the captured image obtained by imaging the surgical part or the like on the basis of the image signal subjected to the image processing by the image processing unit 11412. In this case, the control unit 11413 may recognize various objects in the captured image using various image recognition techniques. For example, the control unit 11413 can detect a shape, a color, and the like of an edge of an object included in the captured image, thereby recognizing surgical instruments such as forceps, a specific biological part, bleeding, mist at the time of using the energy treatment instrument 11112, and the like. When the captured image is displayed on the display device 11202, the control unit 11413 may use the recognition results to superimpose and display various surgery support information on the image of the surgical part. By superimposing and displaying the surgery support information and presenting it to the operator 11131, a burden on the operator 11131 can be reduced, and the operator 11131 can reliably proceed with the surgery.

The transmission cable 11400 that connects the camera head 11102 to the CCU 11201 is an electrical signal cable for communication of an electrical signal, an optical fiber for optical communication, or a composite cable thereof.

Here, in the example of FIG. 25, wired communication is performed using the transmission cable 11400, but the communication between the camera head 11102 and the CCU 11201 may be performed wirelessly.

The example of the endoscopic surgery system to which the technique according to the present disclosure can be applied has been described above. The technique according to the present disclosure can be applied to, for example, the endoscope 11100 or the imaging unit 11402 of the camera head 11102 among the configurations described above. By applying the technique according to the present disclosure to the imaging unit 10402, it is possible to inhibit the instantaneous current in a case in which the imaging unit 10402 captures a flat subject.

Also, although the endoscopic surgery system has been described as an example here, the technique according to the present disclosure may be applied to, for example, a microscopic surgery system.

Application Example to Moving Body

The technique according to the present disclosure may be further applied to devices mounted on various moving bodies such as automobiles, electric vehicles, hybrid electric vehicles, motorcycles, bicycles, personal mobility, airplanes, drones, ships, and robots.

Figure 26:
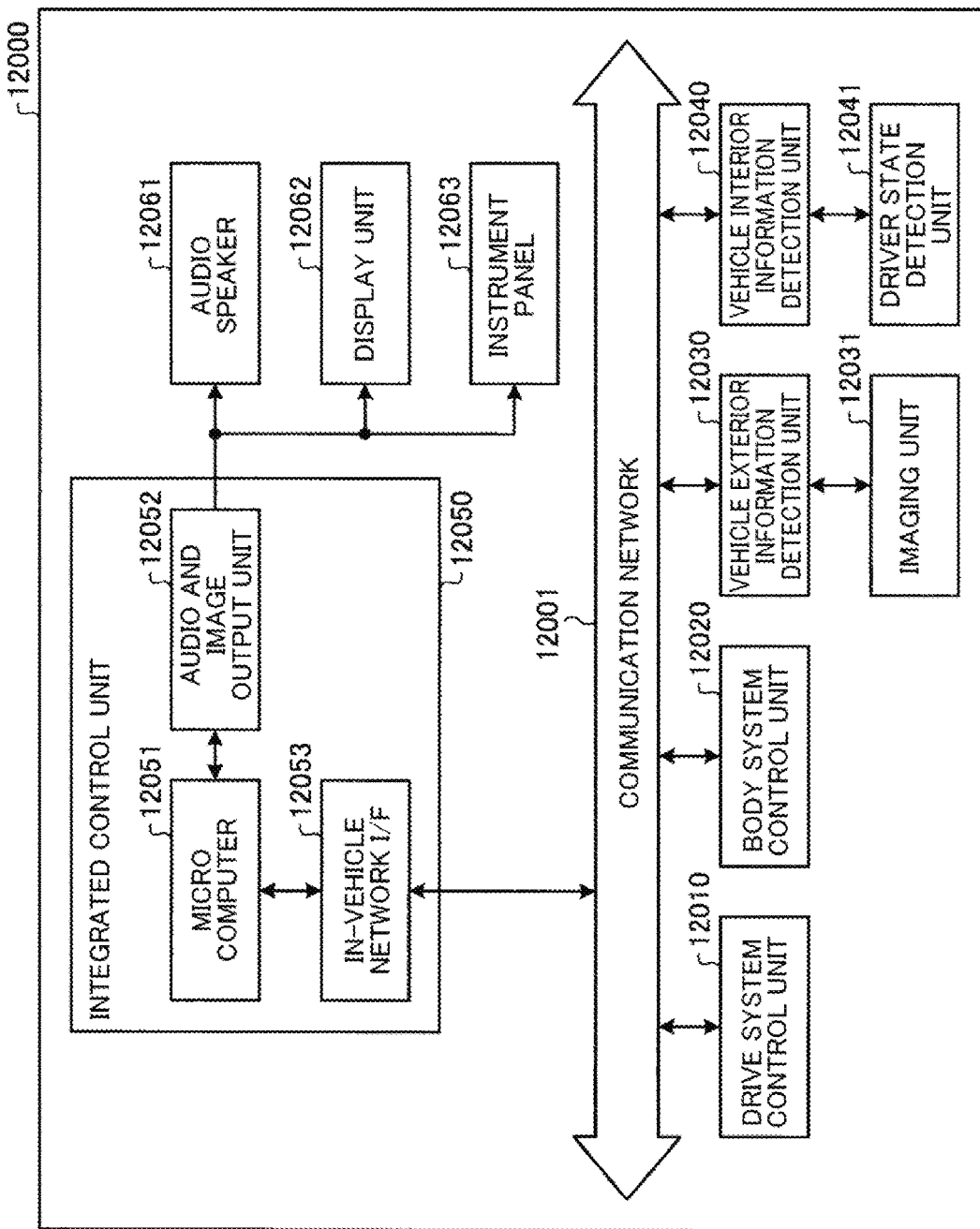
FIG. 26 is a block diagram showing an example of a schematic configuration of a vehicle control system.

FIG. 26 is a block diagram showing a schematic configuration example of a vehicle control system that is an example of a vehicle control system to which the technique according to the present disclosure can be applied.

A vehicle control system 12000 includes a plurality of electronic control units connected via a communication network 12001. In the example shown in FIG. 26, the vehicle control system 12000 includes a drive system control unit 12010, a body system control unit 12020, a vehicle exterior information detection unit 12030, a vehicle interior information detection unit 12040, and an integrated control unit 12050. Further, a microcomputer 12051, an audio and image output unit 12052, and an in-vehicle network interface (I/F) 12053 are illustrated as a functional configuration of the integrated control unit 12050.

The drive system control unit 12010 controls an operation of a device related to a drive system of a vehicle in accordance with various programs. For example, the drive system control unit 12010 functions as a control device for a driving force generation device that generates a driving force of a vehicle such as an internal combustion engine, a driving motor, or the like, a driving force transmission mechanism that transmits a driving force to wheels, a steering mechanism that adjusts a steering angle of a vehicle, a braking device that generates a braking force of a vehicle, etc.

The body system control unit 12020 controls operations of various devices equipped in a vehicle body in accordance with various programs. For example, the body system control unit 12020 functions as a keyless entry system, a smart key system, a power window device, or a control device of various lamps such as a head lamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or the signals and controls a door locking device, a power window device, lamps, and the like of the vehicle.

The vehicle exterior information detection unit 12030 detects external information of the vehicle on which the vehicle control system 12000 is mounted. For example, the imaging unit 12031 is connected to the vehicle exterior information detection unit 12030. The vehicle exterior information detection unit 12030 causes the imaging unit 12031 to capture images of the vehicle exterior and receives the captured images. On the basis of the received images, the vehicle exterior information detection unit 12030 may perform object detection processing or distance detection processing for people, vehicles, obstacles, signs, letters on a road surfaces, and the like. For example, the vehicle exterior information detection unit 12030 performs image processing on the received images and performs object detection processing and distance detection processing on the basis of the results of the image processing.

The imaging unit 12031 is an optical sensor that receives light and outputs an electric signal in accordance with an amount of received light. The imaging unit 12031 can also output the electric signal as an image or can also output the electric signal as ranging information. Also, the light received by the imaging unit 12031 may be visible light or invisible light such as infrared light.

The vehicle interior information detection unit 12040 detects information inside the vehicle. For example, a driver state detection unit 12041 that detects a driver's state is connected to the vehicle interior information detection unit 12040. The driver state detection unit 12041 includes, for example, a camera that images the driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate control target values of the driving force generation device, the steering mechanism, or the braking device on the basis of information regarding the vehicle interior and the vehicle exterior acquired by the vehicle exterior information detection unit 12030 or the vehicle interior information detection unit 12040, and can output a control command to the drive system control unit 12010. For example, the microcomputer 12051 can perform coordinated control for the purpose of realizing a function of an advanced driver assistance system (ADAS) including vehicle collision avoidance, shock alleviation, following travel based on an inter-vehicle distance, vehicle speed maintenance travel, vehicle collision warning, vehicle lane deviation warning, or the like.

Further, the microcomputer 12051 can perform coordinated control for the purpose of automated driving or the like in which autonomous travel is performed without depending on an operation of a driver by controlling the driving force generation device, the steering mechanism, the braking device, and the like on the basis of information regarding the vicinity of the vehicle acquired by the vehicle exterior information detection unit 12030 or the vehicle interior information detection unit 12040.

Further, the microcomputer 12051 can output a control command to the body system control unit 12020 on the basis of information regarding the vehicle exterior acquired by the vehicle exterior information detection unit 12030. For example, the microcomputer 12051 can perform coordinated control for the purpose of achieving antidazzle such as switching of a high beam to a low beam by controlling the head lamp in accordance with a position of a preceding vehicle or an oncoming vehicle detected by the vehicle exterior information detection unit 12030.

The audio and image output unit 12052 transmits an output signal of at least one of an audio and an image to an output device capable of notifying an occupant of the vehicle or the vehicle exterior of information visually or auditorily. In the example of FIG. 26, an audio speaker 12061, a display unit 12062, and an instrument panel 12063 are exemplified as output devices. The display unit 12062 may include, for example, at least one of an onboard display and a head-up display.

Figure 27:
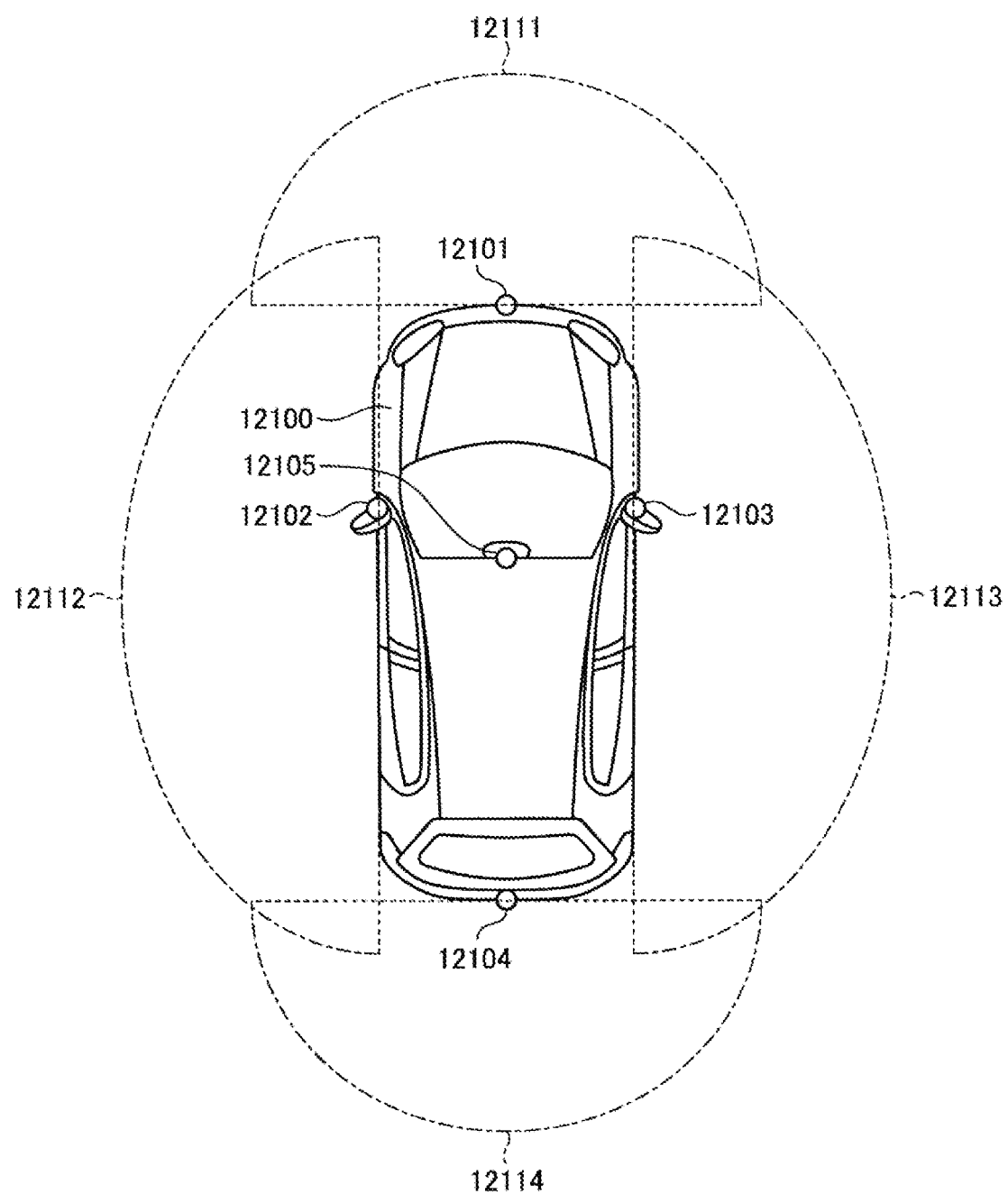
FIG. 27 is an explanatory diagram showing an example of installation positions of a vehicle exterior information detection unit and an imaging unit.

FIG. 27 is a diagram showing an example of an installation position of the imaging unit 12031. In FIG. 27, a vehicle 12100 has imaging units 12101, 12102, 12103, 12104, and 12105 as the imaging unit 12031.

The imaging units 12101, 12102, 12103, 12104, and 12105 are provided, for example, at positions such as a front nose, side mirrors, a rear bumper, a backdoor, and an upper portion of a windshield in the vehicle interior of the vehicle 12100. The imaging unit 12101 provided in the front nose and the imaging unit 12105 provided in the upper portion of the windshield in the vehicle interior mainly acquire images on the front side of the vehicle 12100. The imaging units 12102 and 12103 provided in the side mirrors mainly acquire images on lateral sides of the vehicle 12100. The imaging unit 12104 provided in the rear bumper or the backdoors mainly acquires images on the rear side of the vehicle 12100. The images of the front side acquired by the imaging units 12101 and 12105 are mainly used for detection of preceding vehicles, pedestrians, obstacles, traffic signals, traffic signs, lanes, and the like.

Also, FIG. 31 shows examples of imaging ranges of the imaging units 12101 to 12104. An imaging range 12111 is an imaging range of the imaging unit 12101 provided in the front nose, imaging ranges 12112 and 12113 are imaging ranges of the imaging unit 12102 and 12103 provided in the side mirrors, and an imaging range 12114 is an imaging range of the imaging unit 12104 provided in the rear bumper or the backdoor. For example, by superimposing image data captured by the imaging units 12101 to 12104, it is possible to obtain a bird's eye view image in which the vehicle 12100 is viewed from the upper side.

At least one of the imaging units 12101 to 12104 may have a function of acquiring distance information. For example, at least one of the imaging units 12101 to 12104 may be a stereo camera configured of a plurality of imaging elements or may be an imaging element that has pixels for phase difference detection.

For example, the microcomputer 12051 can obtain a distance to each three-dimensional object within the imaging ranges 12111 to 12114 and a change of the distance over time (a relative speed with respect to the vehicle 12100) on the basis of the distance information obtained from the imaging units 12101 to 12104, to thereby extract, in particular, the closest three-dimensional object on a traveling path of the vehicle 12100, which is a three-dimensional object traveling at a predetermined speed (for example, 0 km/h or more) in the substantially same direction as the vehicle 12100, as a preceding vehicle. Further, the microcomputer 12051 can set an inter-vehicle distance to be secured in front of the preceding vehicle in advance and can perform automated braking control (also including following stop control), automated acceleration control (also including following start control), or the like. In this way, it is possible to perform the coordinated control for automated driving or the like in which autonomous travel is performed without an operation of a driver.

For example, the microcomputer 12051 can classify and extract three-dimensional object data regarding three-dimensional objects into motorcycles, normal vehicles, large vehicles, pedestrians, utility poles, and other three-dimensional objects on the basis of the distance information obtained from the imaging units 12101 to 12104, and can use them for automatic avoidance of obstacles. For example, the microcomputer 12051 identifies obstacles around the vehicle 12100 as obstacles which can be recognized by the driver of the vehicle 12100 and obstacles which are difficult to be recognized. Then, the microcomputer 12051 can determine a collision risk indicating a risk of collision with each obstacle, and in a situation in which the collision risk is equal to or greater than a set value and there is a possibility of collision, can cause the audio speaker 12061 or the display unit 12062 to output an alarm to the driver, or can cause the drive system control unit 12010 to perform forced deceleration and avoidance steering, thereby providing driving support for collision avoidance.

At least one of the imaging units 12101 to 12104 may be an infrared camera that detects infrared light. For example, the microcomputer 12051 can recognize a pedestrian by determining whether or not there is a pedestrian in images captured by the imaging units 12101 to 12104. Such recognition of the pedestrian is performed, for example, through a procedure for extracting feature points in the captured images of the imaging units 12101 to 12104 as an infrared camera, and a procedure for determining whether or not a person is a pedestrian by performing pattern matching processing on a series of feature points indicating the outline of an object. When the microcomputer 12051 determines that there is a pedestrian in the images captured by the imaging units 12101 to 12104 and recognizes the pedestrian, the audio and image output unit 12052 controls the display unit 12062 such that the recognized pedestrian is superimposed and displayed with a rectangular contour line for emphasis. Further, the audio and image output unit 12052 may control the display unit 12062 such that an icon or the like indicating the pedestrian is displayed at a desired position.

The example of the vehicle control system to which the technique according to the present disclosure is applied has been described above. The technique according to the present disclosure may be applied to the imaging unit 12031 and the like among the configurations described above. By applying the technique according to the present disclosure to the imaging unit 12031, it is possible to inhibit the instantaneous current when the imaging unit 12031 photographs a flat subject or the like.

Also, the advantageous effects described in the present specification are merely exemplary and are not intended as limiting, and other advantageous effects may be obtained.

Further, the present technique can adopt the following configurations.

(1)
An imaging device comprising:
a plurality of pixels, each of which includes a light receiving element that generates an electric charge by photoelectric conversion in response to received light,
a pixel circuit that reads the electric charge from the light receiving element and outputs an analog signal in accordance with the electric charge, and
a conversion circuit that converts the analog signal into a digital signal on the basis of comparison results obtained by comparing the analog signal and a reference signal whose voltage changes stepwise at a constant slope over time;
a generation unit that generates, as reference signals, a first reference signal to be supplied to a first pixel of the plurality of pixels and a second reference signal to be supplied to a second pixel of the plurality of pixels different from the first pixel;
a first wiring that connects the generation unit and the first pixel; and
a second wiring that connects the generation unit and the second pixel,
wherein
the first reference signal is supplied to the first pixel via the first wiring, and
the second reference signal is supplied to the second pixel via the second wiring.

(2)
The imaging device according to the above (1),
wherein the generation unit generates the second reference signal obtained by applying an offset to the first reference signal.

(3)
The imaging device according to the above (2),
wherein the generation unit generates the second reference signal obtained by applying the offset, which shifts a reference voltage serving as a reference of the slope, to the first reference signal.

(4)
The imaging device according to the above (2),
wherein the generation unit generates the second reference signal obtained by applying the offset, which shifts the slope in a direction of the time, to the first reference signal.

(5)
The imaging device according to any one of the above (1) to (4),
wherein the plurality of pixels are disposed in a two-dimensional grid array,
the first wiring is provided in a grid pattern, and a plurality of the first pixels in the array are disposed in a one-to-one correspondence at each grid point in the grid pattern, and
the second wiring is provided in a grid pattern, and a plurality of the second pixels in the array are disposed in a one-to-one correspondence at each grid point in the grid pattern.

(6)
The imaging device according to any one of the above (1) to (5),
wherein each of the plurality of pixels is provided with a color filter corresponding to the light receiving element, and at least one of the first wiring and the second wiring is connected to each of the plurality of pixels provided with the color filter that passes the same wavelength component therethrough.

(7)
The imaging device according to any one of the above (1) to (6), further comprising a first semiconductor chip and a second semiconductor chip laminated on the first semiconductor chip,
wherein the light receiving element and the pixel circuit are disposed on the first semiconductor chip, and the conversion circuit and the generation unit are disposed on the second semiconductor chip.

(8)
The imaging device according to the above (7), wherein the first wiring and the second wiring are disposed on the second semiconductor chip.

(9)
The imaging device according to any one of the above (1) to (6), further comprising a first semiconductor chip and a second semiconductor chip laminated on the first semiconductor chip,
wherein the light receiving element, the pixel circuit, and at least a part of the conversion circuit are disposed on the first semiconductor chip, and a portion of the conversion circuit not disposed on the first semiconductor chip and the generation unit are disposed on the second semiconductor chip.

(10)
The imaging device according to (9), wherein the first wiring and the second wiring are disposed on the first semiconductor chip.

(11)
An imaging device comprising:
a plurality of pixels, each of which includes a light receiving element that generates an electric charge by photoelectric conversion in response to received light,
a pixel circuit that reads the electric charge from the light receiving element and outputs an analog signal corresponding to the electric charge, and
a conversion circuit that converts the analog signal into a digital signal on the basis of comparison results obtained by comparing the analog signal and a reference signal whose voltage changes stepwise at a constant slope over time;
a first generation unit that generates a first reference signal to be supplied to a first pixel of the plurality of pixels as the reference signal;
a second generation unit that generates a second reference signal to be supplied to a second pixel of the plurality of pixels as the reference signal;
a first wiring that connects the first generation unit and the first pixel; and
a second wiring that connects the second generation unit and the second pixel,
wherein
the first reference signal is supplied to the first pixel via the first wiring, and
the second reference signal is supplied to the second pixel via the second wiring.

(12)
The imaging device according to the above (11), wherein the first generation unit and the second generation unit are disposed on the same side of a region in which the plurality of pixels are disposed.

(13)
The imaging device according to the above (11) or (12), wherein the first generation unit is disposed on a side of one end of a region in which the plurality of pixels are disposed, and
the second generation unit is disposed at the other end of the region opposite to the one end.

(14)
The imaging device according to any one of the above (11) to (13),
wherein the second generation unit generates the second reference signal obtained by applying an offset to the first reference signal.

(15)
The imaging device according to the above (14),
wherein the second generation unit generates the second reference signal obtained by applying the offset, which shifts a reference voltage serving as a reference of the slope, to the first reference signal.

(16)
The imaging device according to the above (14),
wherein the second generation unit generates the second reference signal obtained by applying an offset, which shifts the slope in a direction of the time, to the first reference signal.

(17)
The imaging device according to any one of the above (11) to (16),
wherein the plurality of pixels are disposed in a two-dimensional grid array,
the first wiring is provided in a grid pattern, and a plurality of the first pixels in the array are disposed in a one-to-one correspondence at each grid point in the grid pattern, and the second wiring is provided in a grid pattern, and a plurality of the second pixels in the array are disposed in a one-to-one correspondence at each grid point in the grid pattern.

(18)
The imaging device according to any one of the above (11) to (17),
wherein each of the plurality of pixels is provided with a color filter corresponding to the light receiving element, and
at least one of the first wiring and the second wiring is connected to each of the plurality of pixels provided with the color filter that passes the same wavelength component therethrough.

(19)
The imaging device according to any one of the above (11) to (18), further comprising a first semiconductor chip and a second semiconductor chip laminated on the first semiconductor chip,
wherein the light receiving element and the pixel circuit are disposed on the first semiconductor chip, and the conversion circuit, the first generation unit, and the second generation unit are disposed on the second semiconductor chip, and
the first wiring and the second wiring are disposed on the second semiconductor chip.

(20)
The imaging device according to the above (19), wherein the first wiring and the second wiring are disposed on the second semiconductor chip.

(21)
The imaging device according to any one of the above (11) to (18), further comprising a first semiconductor chip and a second semiconductor chip laminated on the first semiconductor chip, wherein the light receiving element, the pixel circuit, and at least a part of the conversion circuit are disposed on the first semiconductor chip, and a portion of the conversion circuit not disposed on the first semiconductor chip, the first generation unit, and the second generation unit are disposed on the second semiconductor chip, and the first wiring and the second wiring are disposed on the first semiconductor chip.

(22)

The imaging device according to the above (21), wherein the first wiring and the second wiring are disposed on the first semiconductor chip.

REFERENCE SIGNS LIST

1 Pixel array unit
4 Timing control unit
5, 5a, 5b, 5c, 5c(a), 5c(b), 5c(c) DAC
6 Time code generation circuit
7 Overall control unit
10, 10R, 10G, 10B, 10W Pixel
11 Pixel circuit
12 ADC
13 Storage circuit
14 Calculation circuit
16 Conductive path
20 Write transfer circuit
21 Readout transfer circuit
100 Photodiode
101 FD
120a, 120b, 120c Connection portion
300 Electronic device
1000 Imaging device
1001 First semiconductor chip
1002 Second semiconductor chip
1020 Driver
1021 Via hole
1030, 1031a, 1031b Wiring
1040, 1040a, 1040b First slope
1041, 1041a, 1041b Second slope

What is claimed is:

1. A light receiving device, comprising:
a plurality of pixels that includes a first plurality of pixels and a second plurality of pixels;
a generation circuit configured to generate a first reference signal and a second reference signal, wherein
a first pixel of the first plurality of pixels comprises:
a first light receiving element configured to:
receive light; and
generate a first electric charge based on the received light;
a first pixel circuit configured to output a first analog signal corresponding to the first electric charge;
a first ADC (Analog to Digital Converter) configured to compare the first analog signal and the first reference signal; and
a first conversion circuit configured to convert the first analog signal into a first digital signal based on the comparison of the first analog signal and the first reference signal,
a second pixel of the second plurality of pixels comprises:
a second light receiving element configured to:
receive the light; and
generate a second electric charge based on the received light;
a second pixel circuit configured to output a second analog signal corresponding to the second electric charge;
a second ADC configured to compare the second analog signal and the second reference signal; and
a second conversion circuit configured to convert the second analog signal into a second digital signal based on the comparison of the second analog signal and the second reference signal,
the first pixel is configured to receive the first reference signal through a first wiring, and
the second pixel is configured to receive the second reference signal through a second wiring; and
a calculation circuit configured to:
remove first noise from the first analog signal based on a first time code that is associated with the first reference signal; and
remove second noise from the second analog signal based on a second time code that is associated with the second reference signal.

2. The light receiving device according to claim 1, wherein
the first wiring is configured to connect the generation circuit and the first plurality of pixels, and
the second wiring is configured to connect the generation circuit and the second plurality of pixels.

3. The light receiving device according to claim 1, wherein
the plurality of pixels is in a two-dimensional grid array,
the first wiring is in a grid pattern that includes a plurality of grid points,
each of the first plurality of pixels in the two-dimensional grid array is in one-to-one correspondence at each grid point of the plurality of grid points,
the second wiring is in the grid pattern, and
each of the second plurality of pixels in the two-dimensional grid array is in one-to-one correspondence at each grid point of the plurality of grid points.

4. The light receiving device according to claim 1, further comprising a first semiconductor chip and a second semiconductor chip, wherein
the second semiconductor chip is on the first semiconductor chip,
the first light receiving element, the second light receiving element, the first pixel circuit, and the second pixel circuit are on the first semiconductor chip, and
the first conversion circuit and the second conversion circuit are on the second semiconductor chip.

5. The light receiving device according to claim 4, wherein the first wiring and the second wiring are on the second semiconductor chip.

6. The light receiving device according to claim 1, further comprising a first semiconductor chip and a second semiconductor chip, wherein
the second semiconductor chip is on the first semiconductor chip,
the first light receiving element, the second light receiving element, the first pixel circuit, the second pixel circuit, at least a first part of the first conversion circuit, and at least a first part of the second conversion circuit are on the first semiconductor chip,
a second part of the first conversion circuit and a second part of the second conversion circuit are on the second semiconductor chip,
the second part of the first conversion circuit is different from the first part of the first conversion circuit, and the second part of the second conversion circuit is different from the first part of the second conversion circuit.

7. The light receiving device according to claim 6, wherein the first wiring and the second wiring are on the first semiconductor chip.

8. The light receiving device according to claim 1, wherein
the first reference signal is associated with a first offset voltage and the second reference signal is associated with a second offset voltage different from the first offset voltage.

9. The light receiving device according to claim 1, wherein the generation circuit includes a reference current generation unit.

10. The light receiving device according to claim 9, wherein the reference current generation unit includes at least one of a transistor, a differential amplifier, or a resistor.

\* \* \* \* \*